United States Patent
Goto et al.

(10) Patent No.: US 7,300,353 B2
(45) Date of Patent: Nov. 27, 2007

(54) GAME SERVER, RECORDING MEDIUM FOR STORING GAME ACTION CONTROL PROGRAM AND NETWORK GAME ACTION CONTROL METHOD FOR IMPLEMENTING MULTIPLE PLAYER TEAM ALTERATION

(75) Inventors: Katsuhiro Goto, Neyagawa (JP); Norio Nakayama, Osaka (JP); Hidehisa Takahashi, Amagasaki (JP); Tatsuya Ishikawa, Takarazuka (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 181 days.

(21) Appl. No.: 10/133,839

(22) Filed: Apr. 25, 2002

(65) Prior Publication Data
US 2002/0160824 A1 Oct. 31, 2002

(30) Foreign Application Priority Data
Apr. 27, 2001 (JP) .............................. 2001-133451

(51) Int. Cl.
*G06F 19/00* (2006.01)
(52) U.S. Cl. .............................. 463/42; 463/1; 700/91
(58) Field of Classification Search .................... 463/1, 463/40–42; 700/91
See application file for complete search history.

(56) References Cited

U.S. PATENT DOCUMENTS

| | | | |
|---|---|---|---|
| 6,026,426 A * | 2/2000 | Badovinatz et al. | 718/106 |
| 6,106,395 A | 8/2000 | Begis | |
| 6,152,824 A | 11/2000 | Rothschild et al. | |
| 6,216,150 B1 * | 4/2001 | Badovinatz et al. | 718/106 |
| 6,312,332 B1 * | 11/2001 | Walker et al. | 463/23 |
| 6,487,583 B1 * | 11/2002 | Harvey et al. | 709/204 |
| 6,676,521 B1 * | 1/2004 | La Mura et al. | 463/42 |

FOREIGN PATENT DOCUMENTS

| | | |
|---|---|---|
| KR | 2000-0072207 | 12/2000 |
| WO | WO 95/31061 | 11/1995 |

OTHER PUBLICATIONS

"Counter-Strike 1.5 Manual" [online] Retrieved from the Internet Nov. 04, 2004, URL:<http://www.counter-strike.net/manual.html>.*

* cited by examiner

*Primary Examiner*—Scott E. Jones
(74) *Attorney, Agent, or Firm*—Jordan and Hamburg LLP

(57) ABSTRACT

A search processor associates identifying information regarding terminal devices and stores this in an information memory as a team, an information deletion processor transmits a member deletion request from one terminal device belonging to a team, to the other terminal devices belonging to the team, regarding another terminal device belonging to the team, and deletes from the information memory the identifying information regarding the other terminal device based on the responses from each terminal device, and a replacement processor transmits an admission request from one terminal device belonging to the team to the other terminal devices belonging to the team, selects a terminal device that satisfies the admission criteria included in the admission request based on the responses from the other terminal devices, and stores the identifying information regarding the selected terminal device in the information memory.

15 Claims, 32 Drawing Sheets

FIG. 21A (a) BASIC MELODY

FIG. 21B (b) TONE-DEAF — THE PITCH IS OFF.

FIG. 21C (c) POOR RHYTHM — THE LENGTH OF THE NOTES IS OFF.

FIG. 21D (d) LOW ENDURANCE — THE MELODY PIECE IS SHORT.

B (GUITAR) IS SUGGESTING THAT THE BAND RECRUIT A NEW MEMBER SUBJECT TO THE CONDITION OF 'ANYONE IS OK'. OK?

0) DISAGREE
1) AGREE

X PEOPLE AGREED.
A MAJORITY AGREED TO RECRUIT A NEW MEMBER.
A NEW BAND MEMBER WILL BE RECRUITED.

X PEOPLE AGREED.
A MAJORITY WAS NOT REACHED.
A NEW BAND MEMBER WILL NOT BE RECRUITED.

GAME SERVER, RECORDING MEDIUM FOR STORING GAME ACTION CONTROL PROGRAM AND NETWORK GAME ACTION CONTROL METHOD FOR IMPLEMENTING MULTIPLE PLAYER TEAM ALTERATION

BACKGROUND OF THE INVENTION

1. Field of the Invention

The present invention pertains to a technology for a network game played over a network.

2. Description of the Related Art

In the conventional art, there are Internet sites that can transmit simple games, and network games are known by which a game can be enjoyed by accessing such a game site (game server) from a terminal device such as a cellular telephone.

Among network games are those in which a team is assembled via processing by the game server and the game is played by the team. These types of network games include those in which the game is played by a team through the transmission of game-related information between a game server connected to the network and a plurality of terminal devices formed into the team over the network.

However, in this type of network game, the members of a team that has been formed cannot be changed, and even where a team comprises players having various different agendas, or players with low skill levels, the game must be played for a certain fixed period of time until the game has ended, making the game less interesting and enjoyable to play.

SUMMARY OF THE INVENTION

In order to solve the problems residing in the conventional technologies, according to the present invention, a game server that transmits and receives information to and from a plurality of terminal devices over a network, comprises: a memory; member information processing means for associating identifying information regarding three or more terminal devices and for storing the associated information in the memory as a team; member information deletion means for transmitting a member deletion request regarding one terminal device belonging to the team from the another one of said terminal devices belonging to said team to the other terminal devices belonging to said team and for deleting the identifying information of said one of the terminal device from said memory based on the responses from each terminal device in regard to said member deletion request; and member replacement means for transmitting a member admission request from one terminal device belonging to said team to the other terminal devices belonging to said team, selecting a terminal device that does not belong to said team and satisfies admission criteria included in said member admission request based on the responses from the other terminal devices to said member admission request, and for storing the identifying information regarding the selected terminal device in said memory as a member of said team.

According to this construction, identifying information regarding three or more terminal devices from among a plurality of terminal devices previously registered as members is associated together and stored in a prescribed memory as a team. A member deletion request is transmitted from one terminal device belonging to the team regarding which identifying information is associated together, to the terminal devices of the other members to the team, seeking deletion of another terminal device stored in the memory as a member of the team. Based on the responses of each terminal device to this member deletion request, the identifying information regarding the other terminal device is deleted from the memory. Following this deletion processing, a member admission request seeking the admission of a new terminal device as a member of the team to replace the terminal device deleted from the memory is sent by a terminal device belonging to the team to the other terminal devices belonging to the team. Based on the responses of each terminal device to this member admission request, a terminal device that satisfies the admission criteria included in the member admission request is selected from among terminal devices that are not registered in the memory and do not belong to the team, and the identifying information regarding the selected terminal device is stored in the memory as a team member. In this way, a player having a different game intention or a player with a low skill level can be removed from the team and a new member having the same game intention or a member with a high skill level can be admitted to the team.

These and other objects, features, and advantages of the present invention will become more apparent upon reading the following detailed description along with the accompanying drawings.

BRIEF DESCRIPTION OF THE DRAWINGS

FIG. 21 is drawing showing examples of an arrangement routine executed by the incoming call tone melody creation means;

FIG. 29 is an example of a screen transmitted to a cellular telephone;

FIG. 30 is an example of a screen transmitted to a cellular telephone;

FIG. 31 is an example of a screen transmitted to a cellular telephone;

DESCRIPTION OF THE PREFERRED EMBODIMENTS

Figure 1:
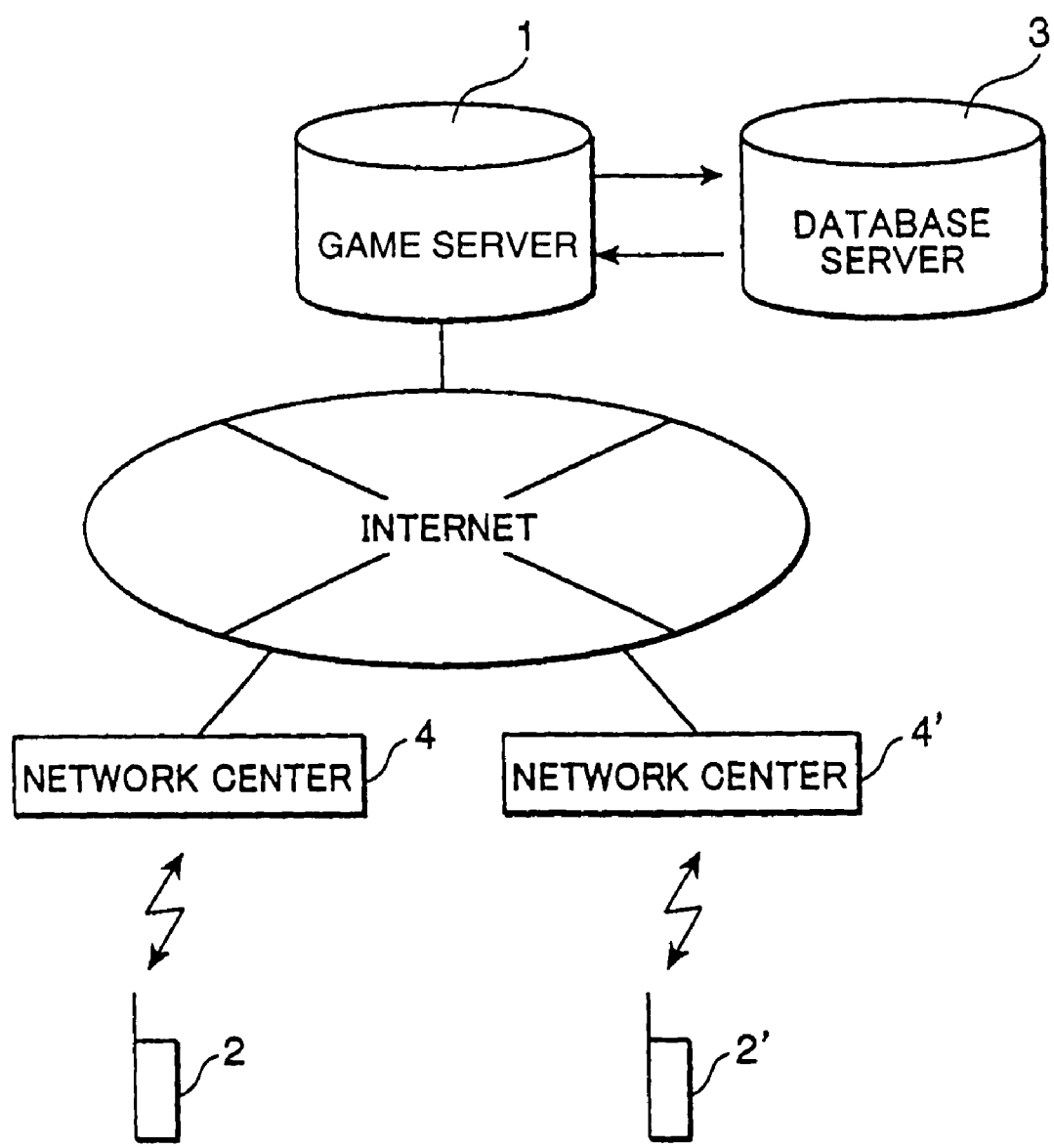
FIG. 1 is a drawing showing the overall construction of the network game system in which the present invention is applied.

FIG. 1 is a drawing showing the overall construction of a network game system in which the network game action control program pertaining to the present invention is executed. The network game comprises a game (Web) server 1 that is connected to the Internet, which comprises the network, cellular telephone 2, which is an example of a mobile communication device that functions as a terminal device, a database server 3 that stores data such as member information, and a network center 4 that constitutes the mobile communications business that mediates the connection between the cellular telephone 2 and the Internet. The network center 4' is another mobile communications business that mediates the connection between the cellular telephone 2' and the Internet. In this embodiment, the game server 1 and the database server 3 are described as separate components, but they may comprise the same component.

Figure 2:
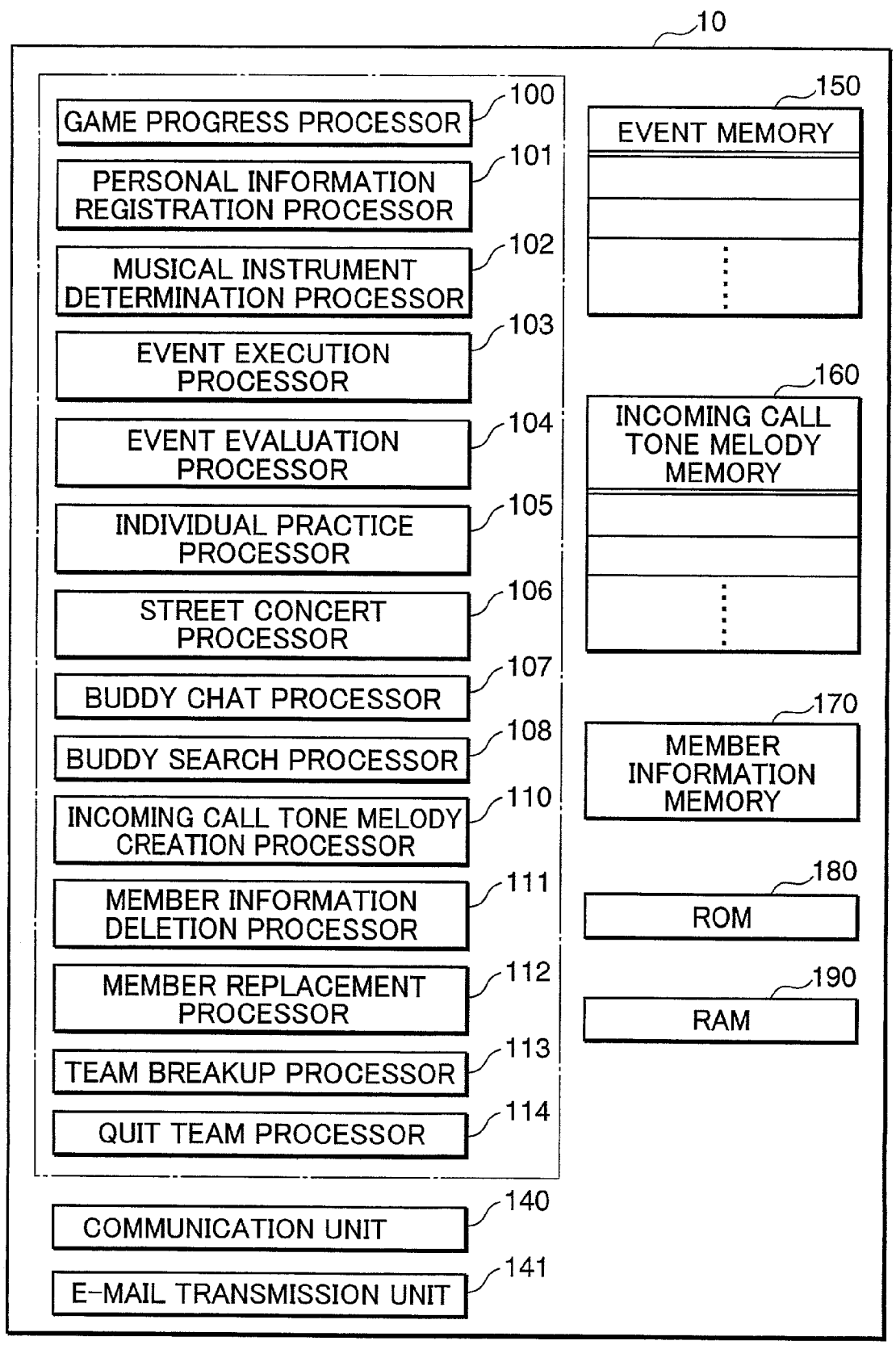
FIG. 2 is a functional construction diagram of an incoming call tone melody award game device.

The game server 1 is a prescribed server (such as a server run by an Internet service provider with which the administrator of this system has a contract) among the numerous servers connected to the Internet, and includes the incoming call tone melody award game device 10 that comprises the server-side game device shown in FIG. 2. This incoming call tone melody award game device 10 includes internal hardware and software needed for the playing of an incoming call tone melody award game. It also has an own-address storage unit and a temporary storage unit for e-mail address data and the like sent by players.

The database server 3 is a server that manages data such as member personal information used in the game, and among other things, stores and searches for various types of data. Member data comprises such data as e-mail addresses for the cellular telephone 2 possessed by each member, personal information for each member input from the personal information input screen 400 described below, such as 'Nickname', 'Gender', Favorite musical genre', 'Address', 'Age', etc., part selection information input from a part selection screen 410 described below, individual evaluation parameter values such as 'rhythm', 'pitch' and 'endurance', which are managed with the purpose of determining the incoming call tone melody data mainly provided to members via the incoming call tone creation processor 110 described below, and the value for 'physical strength' that comprises the standard for determining whether or not the activities selected from the menu screen described below can be carried out.

FIG. 2 is a functional construction drawing of the incoming call tone melody award game device 10. The incoming call tone melody award game device 10 includes a game progress processor 100 that controls the game action, a personal information registration processor 101 that carries out member registration processing of personal information on the player that plays the game using a cellular telephone 2, a musical instrument determination processor 102 that determines the role (part) of the player in a band that operates as a team, an event execution processor 103 that reads a prescribed event from an event memory 150 and executes the event, an event evaluation unit 104 that evaluates the results of the executed event and updates individual evaluation parameters for the player registered as a member, a buddy search processor 108 that searches for buddies that will comprise a band that operates as a team, an incoming call tone melody creation processor 110 that selects an incoming call tone melody from an incoming call tone melody memory 160 based on individual evaluation parameters for the player, which constitute event evaluation results, a member information deletion processor 111 that deletes identifying information regarding a cellular telephone 2 from the member information memory 170 in response to deletion approval responses, a member replacement processor 112 that registers identifying information regarding a cellular telephone 2 in the member information memory 170 in response to admission approval responses, a team breakup processor 113 that deletes identifying information regarding all cellular telephones 2 belonging to a team registered in the member information memory 170 in response to breakup approval responses, a quit team processor 114 that deletes a given cellular telephone 2 from the member information memory 170 in response to a quit request from that cellular telephone 2, an event memory 150 that stores image data and text data that are prepared as events, as well as image data and text data needed for game action, an incoming call tone melody memory 160 that stores multiple ranked incoming call tone melodies, a member information memory 170 that stores identifying information corresponding to a given number of cellular telephones 2 as a team by associating it together, a ROM 180 that stores the game program, etc., and a RAM 190 that temporarily stores data undergoing processing.

The communication unit 140 enables data communication between the cellular telephone 2 possessed by each player and the server 1, transmits to the cellular telephone 2 various game screens including necessary image and text data and leads them to the monitor, and receives the contents of transmissions from the cellular telephone 2. In addition, it transmits to the player the incoming call tone melody data created by the incoming call tone melody creation processor 110.

The e-mail transmission unit 141 performs processing to send the game action notification information to each player's cellular telephone 2 via e-mail. The e-mail transmission unit 141 can also simultaneously transmit identical e-mails to multiple cellular telephones.

The processing carried out between and including the routines executed by the personal information registration processor 101 and the incoming call tone melody creation processor 110 are explained below with reference to FIGS. 8 through 21, and the processing carried out between and including the routines executed by the member information deletion processor 111 and the quit team processor 114 are explained below with reference to FIGS. 22 through 39.

The buddy search processor 108 functions as member information processing means, the member information deletion processor 111 functions as member information deletion means, the member replacement processor 112 functions as member replacement means, the e-mail transmission unit 141 functions as e-mail transmission means, and the member information memory 170 functions as a memory.

Figure 3:
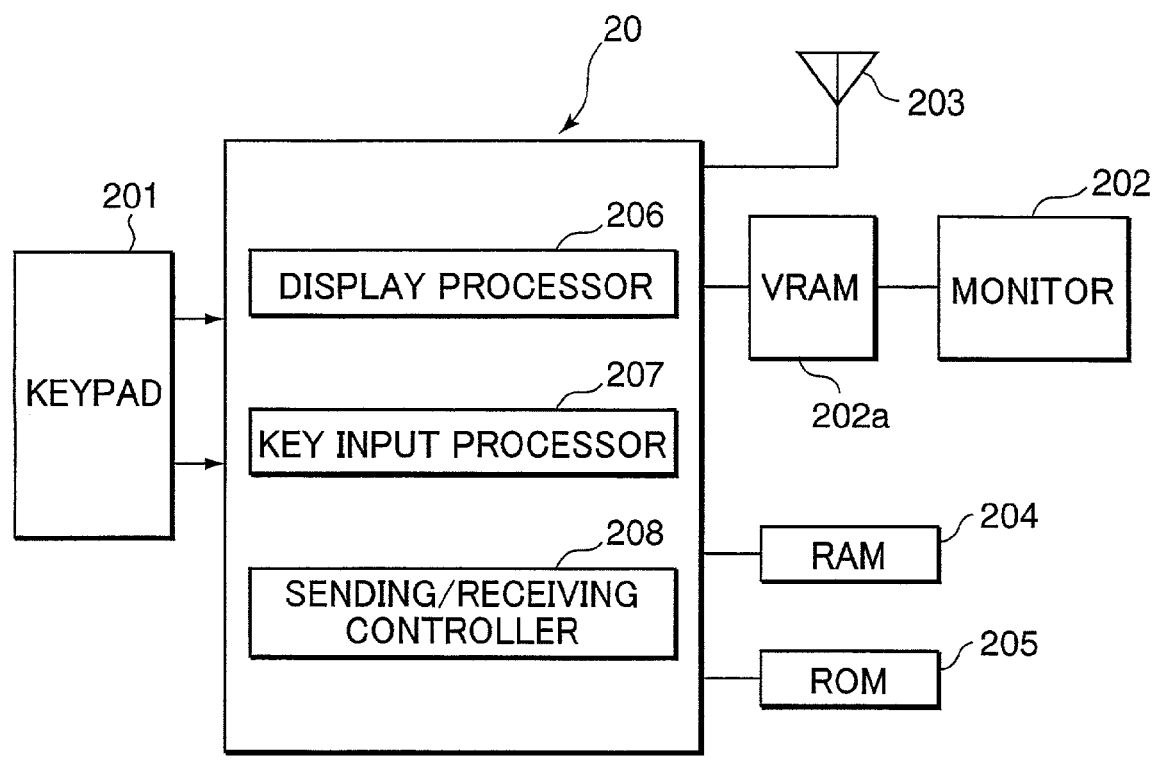
FIG. 3 is a block diagram of a cellular telephone comprising one example of a terminal device.

FIG. 3 is a block diagram of a cellular telephone 2, and extracts and explains only the particular functions necessary for the implementation of the present invention. The cellular telephone 2 includes a controller 20 comprising a computer that performs comprehensive control of the various components, and this controller 20 is connected to a keypad 201 that functions as an input member, a VRAM 202*a* that stores image data displayed on a monitor 202, an antenna 203, a RAM 204 that temporarily stores input data and data for processing, and a ROM 25 that stores the game program, etc.

The keypad 201 has a ten-key keypad used for input of telephone numbers, as well as function keys used for moving the cursor displayed on the monitor 202 and for decision-making, and a circuit ON/OFF key and the like. Text can be input using the ten-key keypad in accordance with the function key settings, which enables e-mail data and e-mail addresses to be input.

The VRAM 202*a* temporarily stores images displayed on the monitor 202 that comprises a liquid crystal display device or other apparatus, and by repeatedly reading to and displaying on the monitor 202 at prescribed cycles the images written to the VRAM 202*a*, such images can be viewed as still images due to the afterimage phenomenon.

The display processor 206, the key input processor 207 and the sending/receiving controller 208, which collectively comprise the controller 20, will now be explained. The display processor 206 displays on the monitor 10 input operation confirmations, various input guide images, and image data sent from the incoming call tone melody award game 10. It also displays the contents of e-mails. The display controller 206 has a capacity sufficient to store at least one screen's worth of image data. For example, where only a part of an image is displayed on the monitor 202, the image can be scrolled up, down or in some other direction in response to the operation of specified keys on the keypad 201, helping to permit the entire image to be seen. The key input processor 207 creates information in response to the operation of the keypad 201.

The sending/receiving controller 208 performs circuit control in connection with the making and receiving of calls to and from wireless public lines and the sending and receiving of sound data, as well as processing in connection with the sending and receiving of data contained in e-mails sent over the Internet or other network, and the sent and received data is transmitted via the antenna 203. The image data sent and received via the cellular telephone 2 is transmitted in packets after being compressed in GIF format, for example.

The basic game sequence for the game in which the present invention is applied will now be explained. A player accesses the game server 1 from his or her cellular telephone 2, game images and various other type of image information (here, 'image information' comprises at least image data or text data) are received by the player's cellular telephone 2 from the incoming call tone melody award game device 10 of the game server 1 as game data, and these images are displayed on the monitor 202 of the cellular telephone 2. The game proceeds via player responses to instructions (in this embodiment, question numbers for questions posed in a multiple-choice format) contained in the images displayed on the monitor 202. The response data (number data) is transmitted to the incoming call tone melody award game device 10 as game data, prescribed evaluation processing is carried out as game processing in response to this data, and the player's individual evaluation parameters are updated. Through repetition of this sending and receiving process and of the evaluation processing for a prescribed number of times, evaluation results comprising the player's individual evaluation parameters are finally determined. In response to these individual evaluation parameters, an incoming call tone melody is determined and is transmitted to the player's cellular telephone 2 over the network.

Figure 4:
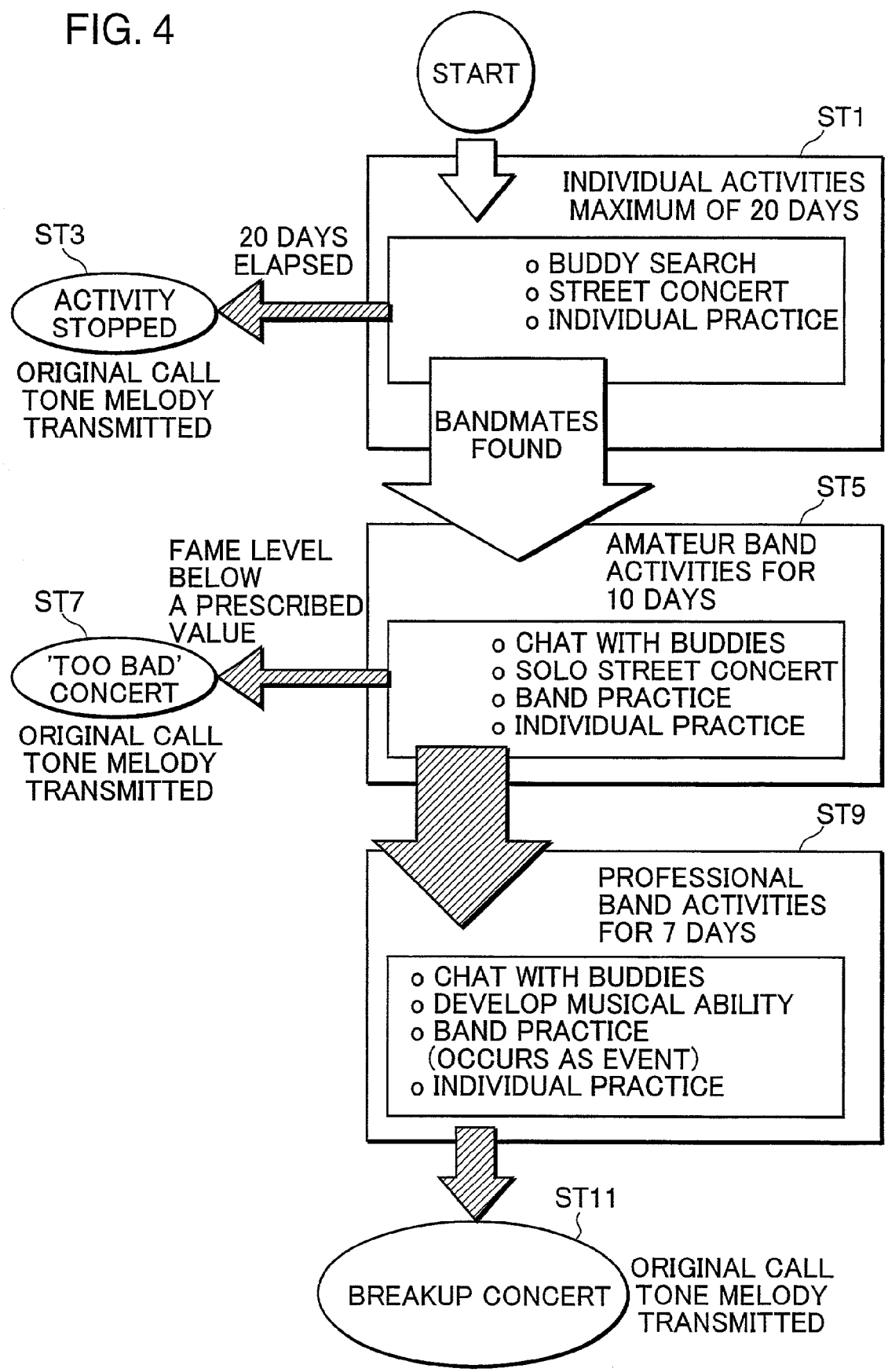
FIG. 4 is a diagram showing the basic sequence of the overall game.

FIGS. 4 through 7 are diagrams showing the sequence of the incoming call tone melody award game. FIG. 4 is a diagram showing the basic sequence of the overall game. First, a game such as a 'Buddy search' game, in which buddies that will form a team (here, a musical band) are sought within an individual activity period that comprises a maximum of 20 days, is played (ST1). If bandmates are not found within 20 days of the commencement of the game, the incoming call tone melody is determined based on the player's individual evaluation parameter values at that point, the incoming call tone melody is transmitted to the player's cellular telephone 2, and the game ends (ST3).

If bandmates are found within 20 days of the commencement of the game and a team is formed, a 10-day amateur band activity period commences. During this 10-day amateur band activity period, a 'Band practice' or similar game described below progresses. 'Band practice' is a game in which a team event takes place through the cooperation of all of the members comprising the team (i.e., the band), the results of the responses made by all of the members of the band comprising the team are collectively evaluated, and the player's individual evaluation parameter values are updated (ST5). Once the 10-day amateur band activity period has elapsed, the 'fame' parameter, which is one of the player's individual evaluation parameters, is evaluated, and if the value does not reach a prescribed value, an incoming call tone melody is determined based on the player's individual evaluation parameter values, the incoming call tone melody is transmitted to the player's cellular telephone 2, and the game ends (ST7).

Where the 10-day amateur band activity period has elapsed, the 'fame' parameter comprising one of the player's individual evaluation parameters is evaluated, and the value equals or exceeds a prescribed value, a seven-day professional band activity period commences. During this seven-day professional band activity period, the 'Band practice' game described above or a similar game is played (ST9). Once the seven-day professional band activity period elapses, an incoming call tone melody is determined based on the player's individual evaluation parameter values, the incoming call tone melody is transmitted to the player's cellular telephone 2, and the game ends (ST11).

Figure 5:
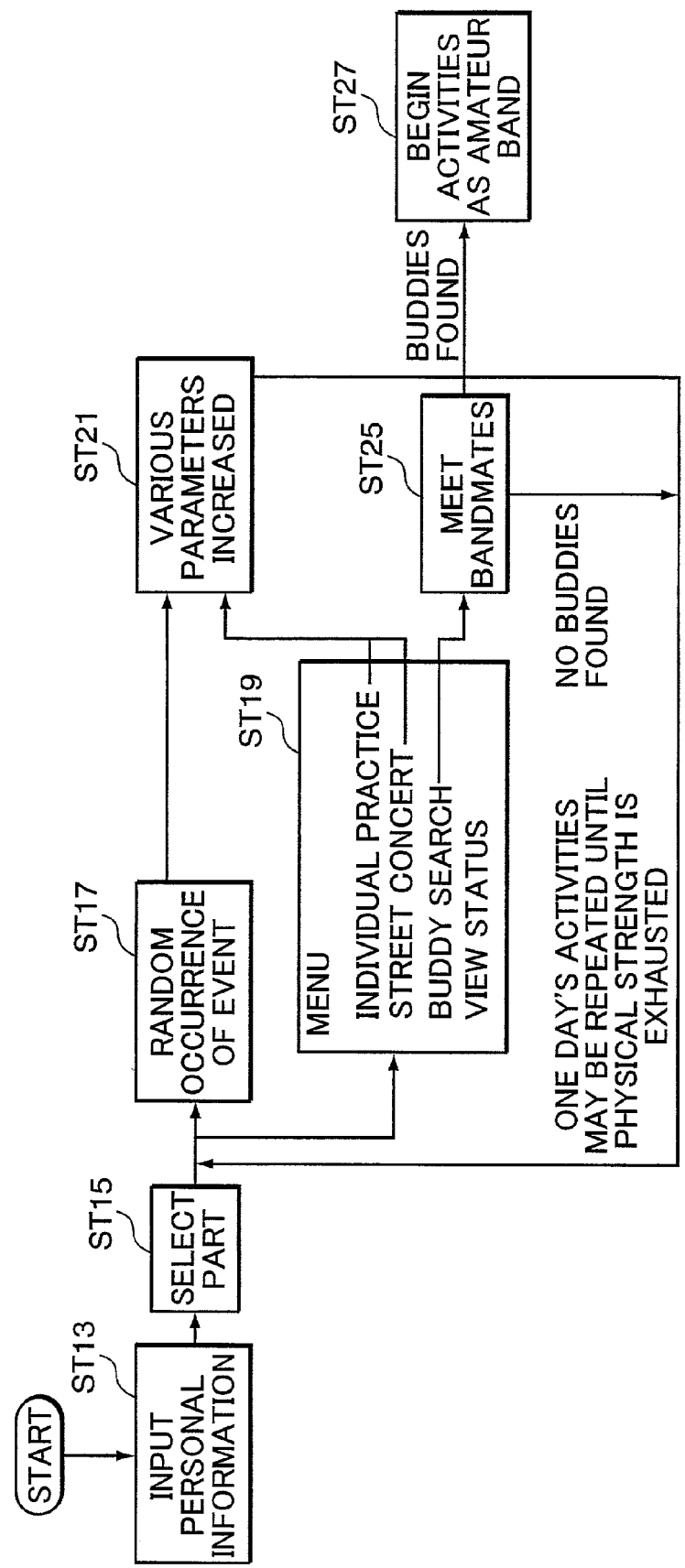
FIG. 5 is a diagram showing the game sequence during the period that one person is performing activities.

FIG. 5 is a diagram showing the sequence of the game played during the individual activity period. Before the game begins, first, member registration is carried out via the input of personal information (ST13). The parts that will be played by the players in a band are selected by the players in order to form a band that will operate as a team (ST15). Here, the band comprises the four parts of 'Vocals', 'Guitar', 'Bass' and 'Drums', for example. When part selection is completed, the game begins.

When the game begins, an event is randomly read out from the event memory 150 and executed (ST17). The results of the execution of the event are then evaluated, and the player's individual evaluation parameter values are updated (ST21). The player can select activities such as 'Individual practice' or 'Street concert' until the player's 'physical strength' for that day is exhausted (ST19). Here, 'physical strength' is managed as a numerical value, and is depleted based on the type of activity and the amount of time that the activity is performed. In addition, where the 'Individual practice' activity is carried out, for example, the player's individual evaluation parameter values are updated in accordance with the results of such activity (ST21). The player can also perform a 'Buddy search' to look for bandmates (ST19). If buddies are found as a result of the 'Buddy search' and a band (team) is formed, amateur band activities commence (ST27). The game carried out during the individual activity period described above can be played repeatedly within a maximum period of 20 days following member registration. If bandmates are not found within the maximum 20-day period, an incoming call tone melody is determined based on the player's individual evaluation parameter values, the determined incoming call tone melody is transmitted to the cellular telephone 2, and the game ends.

Figure 6:
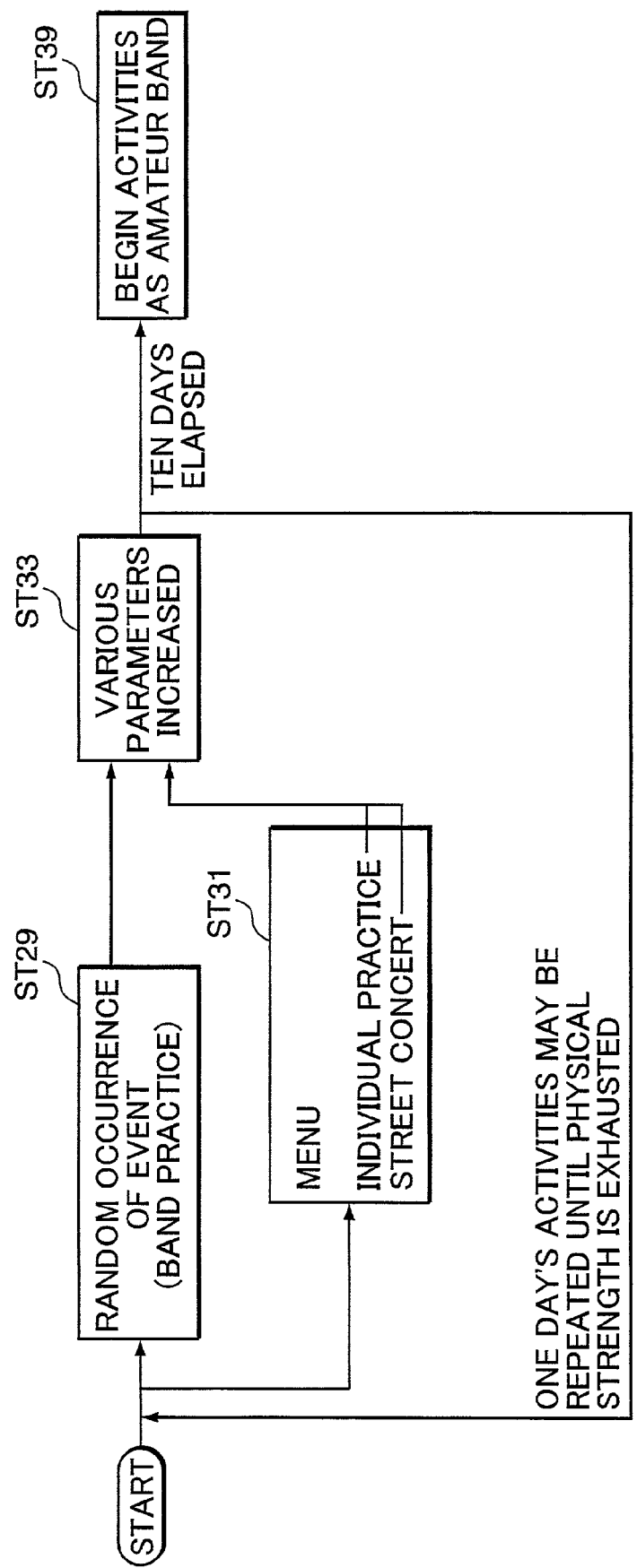
FIG. 6 is a diagram showing the game sequence during the period that players are performing activities as an amateur band.

FIG. 6 is a diagram showing the sequence of the game played during the amateur band activity period. First, an event is randomly read out from the event memory 150 and executed (ST29). The results of the execution of the event are then evaluated, and the player's individual evaluation parameter values are updated (ST33). Such events include team events (for example, band practice) jointly executed by all of the band members. The results of the execution of team events are evaluated for the team as a whole, and the player's individual evaluation parameter values are updated.

The player can also select activities such as 'Individual practice' or 'Street concert' until the player's 'physical strength' for that day is exhausted (ST31). Here, 'physical strength' is managed as a numerical value, and is depleted based on the type of activity and the amount of time that the activity is performed. Where the 'Individual practice' activity is carried out, for example, the player's individual evaluation parameter values are updated in accordance with the results of such activity (ST33). Where the 'fame' parameter comprising one of the player's individual evaluation parameters equals or exceeds a prescribed value, professional band activities commence (ST39).

The game carried out during the amateur band activity period described above can be played repeatedly within a maximum period of 10 days following the commencement of amateur band activity. If the 'fame' parameter comprising one of the player's individual evaluation parameters does not equal or exceed a prescribed value within the maximum 10-day period, an incoming call tone melody is determined based on the player's individual evaluation parameter values, the determined incoming call tone melody is transmitted to the cellular telephone 2, and the game ends.

Figure 7:
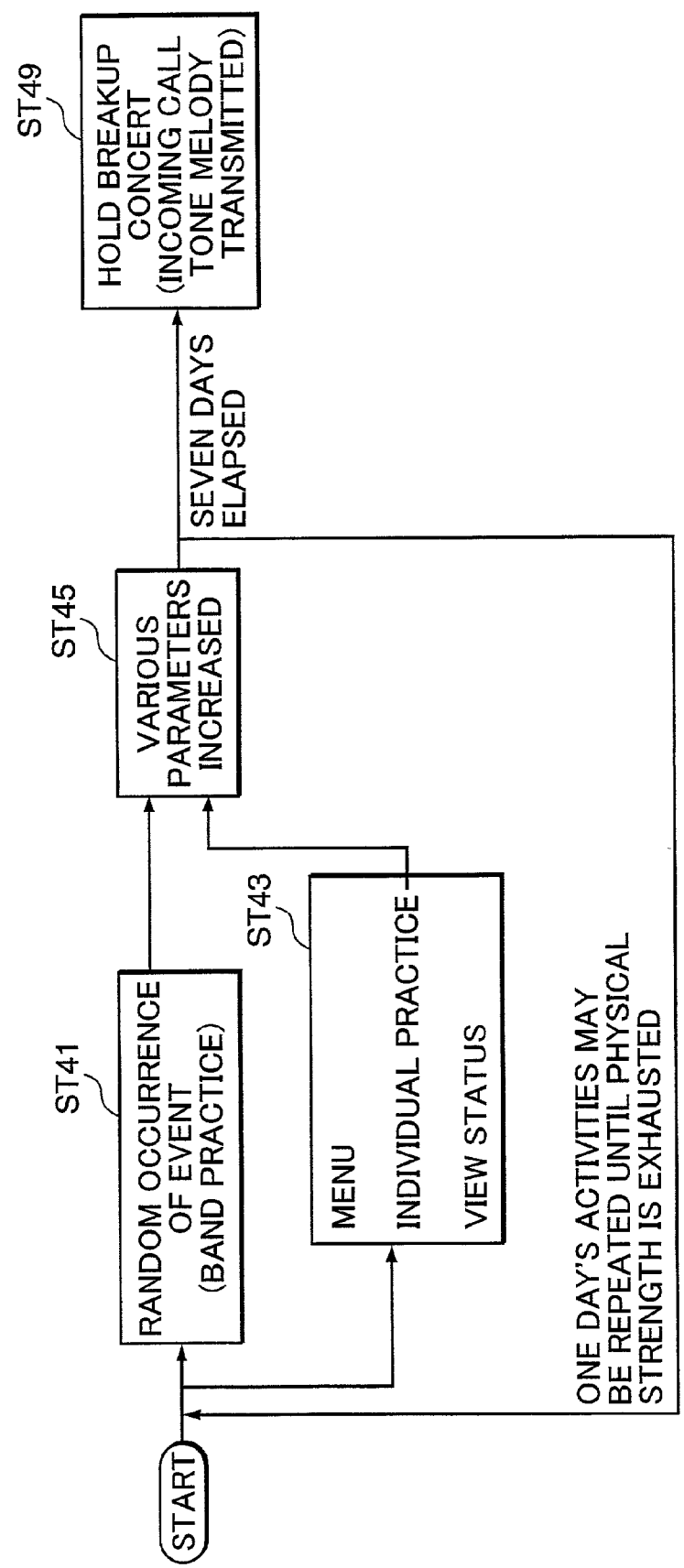
FIG. 7 is a diagram showing the game sequence during the period that players are performing activities as a professional band.

FIG. 7 is a diagram showing the sequence of the game played during the professional band activity period. First, an event is randomly read out from the event memory 150 and executed (ST41). The results of the execution of the event are then evaluated, and the player's individual evaluation parameter values are updated (ST45). Such events include team events (for example, band practice) jointly executed by all of the band members. The results of the execution of team events are evaluated for the team as a whole, and the player's individual evaluation parameter values are updated.

The player can also select activities such as 'Individual practice' until the player's 'physical strength' for that day is exhausted (ST43). Here, 'physical strength' is managed as a numerical value, and is depleted based on the type of activity and the amount of time that the activity is performed. Where the 'Individual practice' activity is carried out, for example, the player's individual evaluation parameter values are updated in accordance with the results of such activity (ST45).

The game carried out during the professional band activity period described above can be played repeatedly within a maximum period of seven days following the commencement of professional band activity. When the seven-day period has elapsed, an incoming call tone melody is determined based on the player's individual evaluation parameter values, the determined incoming call tone melody is transmitted to the cellular telephone 2, and the game ends (ST49).

Figure 8:
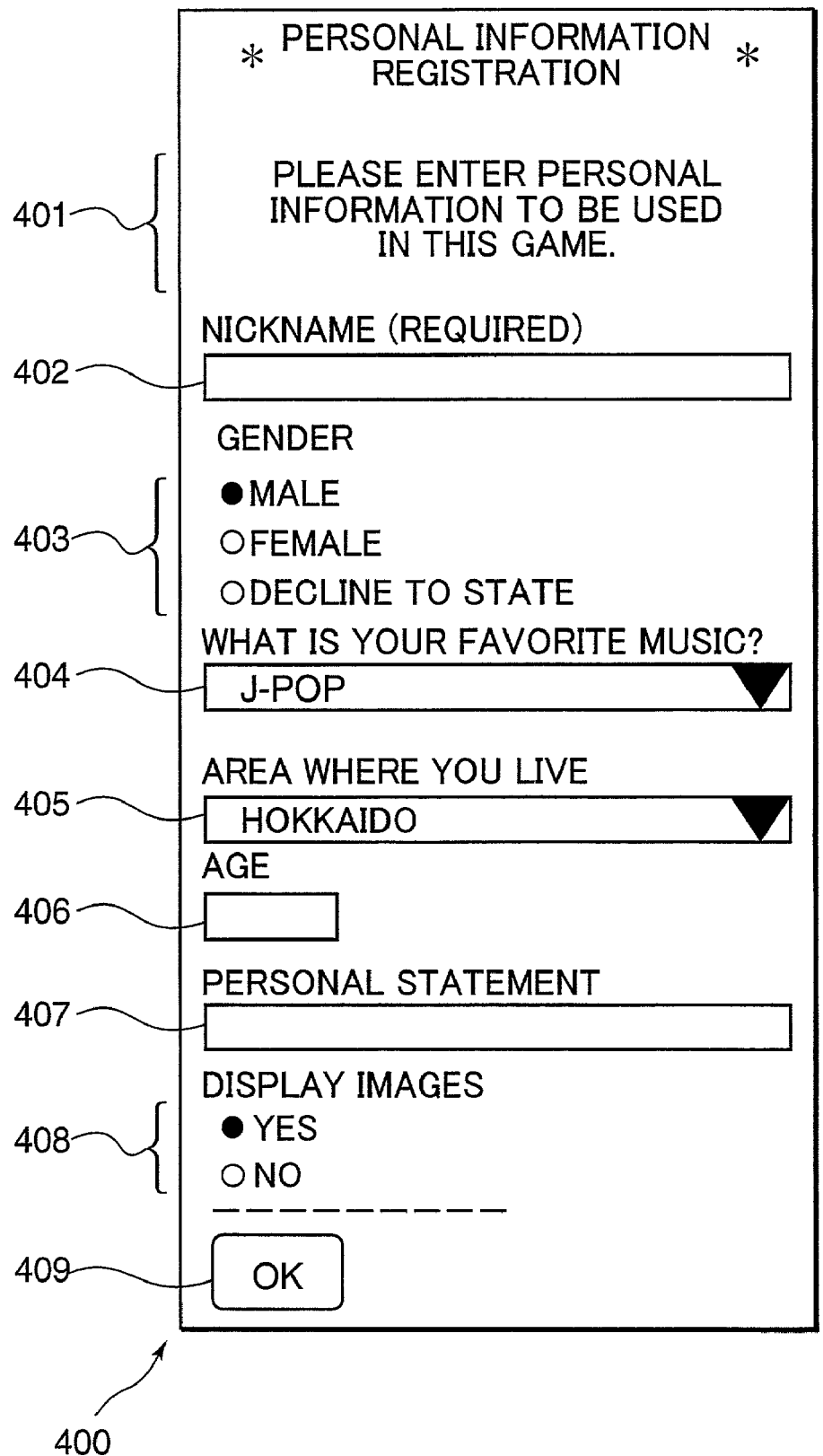
FIG. 8 is an example of a personal information input screen displayed when a player is registering as a member.

FIG. 8 is an example of the personal information input screen displayed when member registration for a player is carried out. When the player accesses the game server 1 from the cellular telephone 2 in order to begin the incoming call tone melody award game, the data for the personal information input screen 400 is read out from the event memory 150 by the personal information registration processor 101 and is then transmitted to and displayed on the cellular telephone 2.

The personal information input screen 400 comprises a guidance display area 401 that displays guidance regarding input operations, a nickname input area 402 in which a nickname comprising a name by which the cellular telephone 2 for which member registration is performed is to be recognized after the game begins is entered, a gender input area 403 in which a gender is selected and entered, a musical genre input area 404 in which the desired musical genre is selected and entered from among 'J-POPS', 'Rock', 'R&B', 'Techno' and 'Enka', an address input area 405 in which the geographical area in which the player comprising the user of the cellular telephone 2 lives is selected and entered, an age input area 406 in which the age of the player comprising the user of the cellular telephone 2 is entered, a self-PR input area 407 in which the player comprising the user of the cellular telephone 2 enters information about himself or herself, an image display input area 408 in which the player inputs a selection regarding whether or not images are to be displayed on the cellular telephone 2 when the game is played, and an OK button 409 that is pressed when the various input operations are completed.

When the player completes the input of information using the personal information input screen 400 displayed on the cellular telephone 2 and presses the OK button 409, the input personal information is transmitted from the cellular telephone 2 to the game server 1, and is then transmitted by the personal information registration processor 101 from the game server 1 to the database 3, where it is stored. The personal information input from the personal information input screen 400 is stored in the database server 3 at least until the player completes the game.

Figure 9:
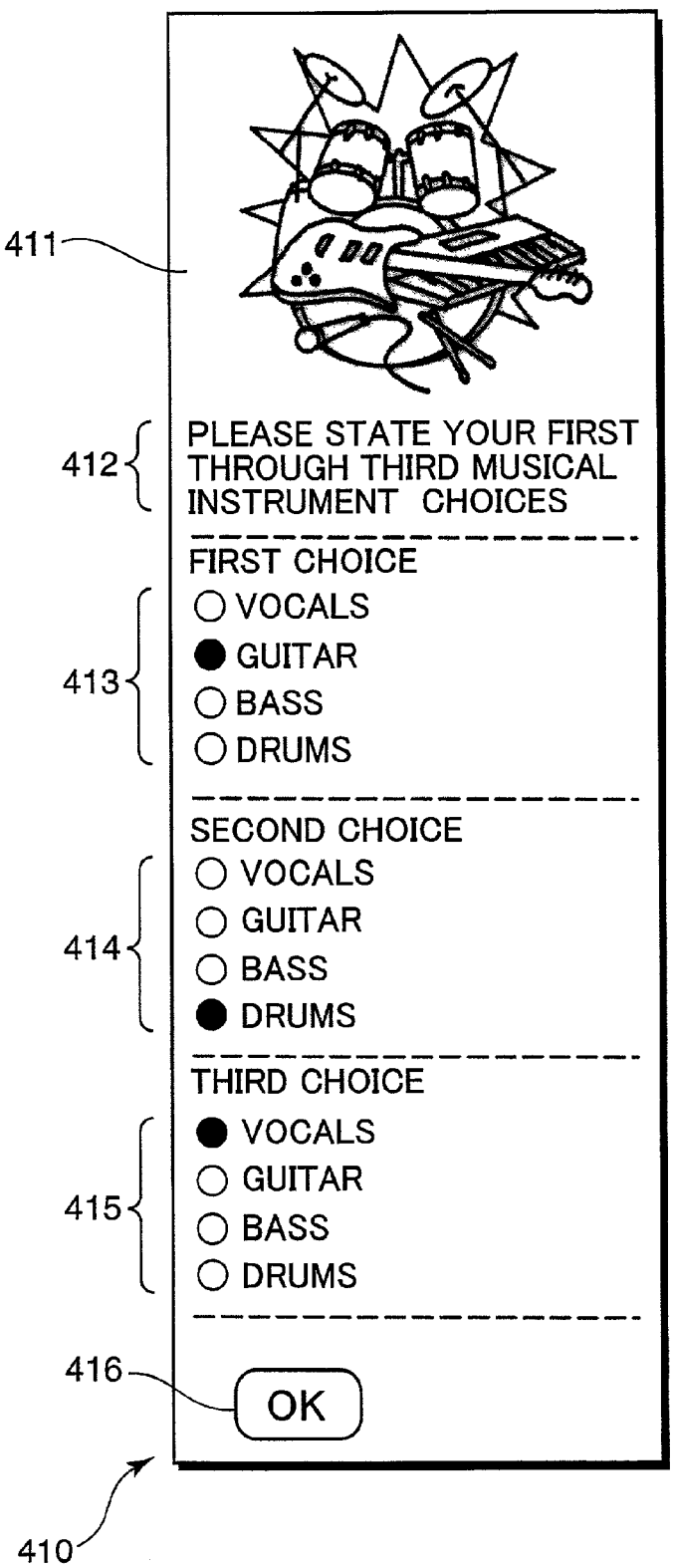
FIG. 9 is an example of a part selection screen displayed when the part of a player belonging to a band that operates as a team is to be input.

FIG. 9 is an example of a part selection screen displayed to input the part of the player in a band that operates as a team after member registration for that player is performed. When the player completes the input of personal information using the personal information input screen 400 and the information is sent to the game server 1, part selection screen data is read out by the musical instrument determination processor 102 from the event memory 150 and is then transmitted to and displayed on the cellular telephone 2.

The part selection screen 410 comprises an image display area 411 that displays an image indicating part selection, a guidance display area 412 that displays guidance regarding the input operation, a first-choice input area 413 in which the player selects and enters a first-choice part from a group of four parts consisting of 'Vocals', 'Guitar', 'Bass' and 'Drums', a second-choice input area 414 in which the player selects and enters a second-choice part from this group of four parts, a third-choice input area 415 in which the player selects and enters a third-choice part from this group of four parts, and an OK button 416 that is pressed when these input operations are completed.

When the player completes the input of information using the part selection screen 410 displayed on the cellular telephone 2 and presses the OK button 416, the input part selection information is transmitted from the cellular telephone 2 to the game server 1, and is then transmitted by the musical instrument determination processor 102 from the game server 1 to the database 3, where it is stored. As with the player's personal information, the part selection information input from the part selection screen 410 is stored in the database server 3 at least until the player completes the game. When the input operations on the part selection screen 410 are completed and the OK button 416 is pressed, the input part selection information is transmitted from the cellular telephone 2 to the game server 1 and the game begins.

Figure 10:
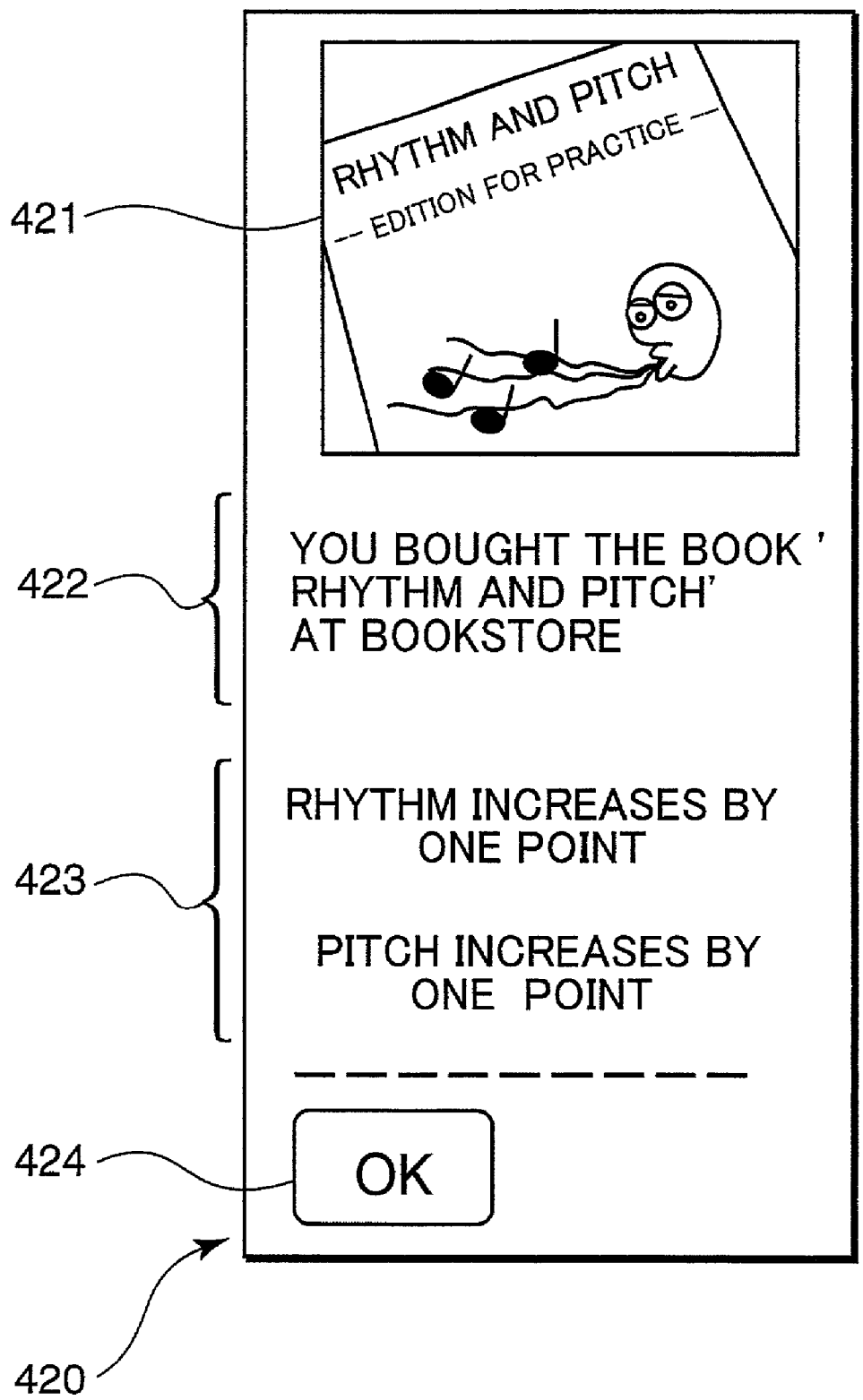
FIG. 10 is an example of an event display screen displayed when an event is executed.

FIG. 10 is an example of an event display screen displayed when an event is executed after input on the part selection screen 410 is completed and the game is begun. The game begins with the game played during the individual activity period. When the part selection information is transmitted from the cellular telephone 2 to the game server 1, the game begins, event display screen data for an event randomly selected by the event execution processor 103 is read out from the event memory 150, and this data is then transmitted to and displayed on the cellular telephone 2.

The event display screen 420 comprises a screen display area 421 that displays an image indicating the contents of the event, a contents display area 422 that displays the contents of the event, an individual evaluation parameter update result display area 423 that displays the amount by which the player's individual evaluation parameter values will be updated in accordance with the results of the executed event, and an OK button 424 that is pressed after the contents of the event are confirmed.

When the player completes confirmation of the contents of the event display screen 420 displayed on the cellular telephone 2 and presses the OK button 424, the confirmation of the event is transmitted from the cellular telephone 2 to the game server 1, the player's individual evaluation parameter values are updated by the event evaluation processor 104 in response to the event, and these values are transmitted to and stored in the database server 3.

Figure 11:
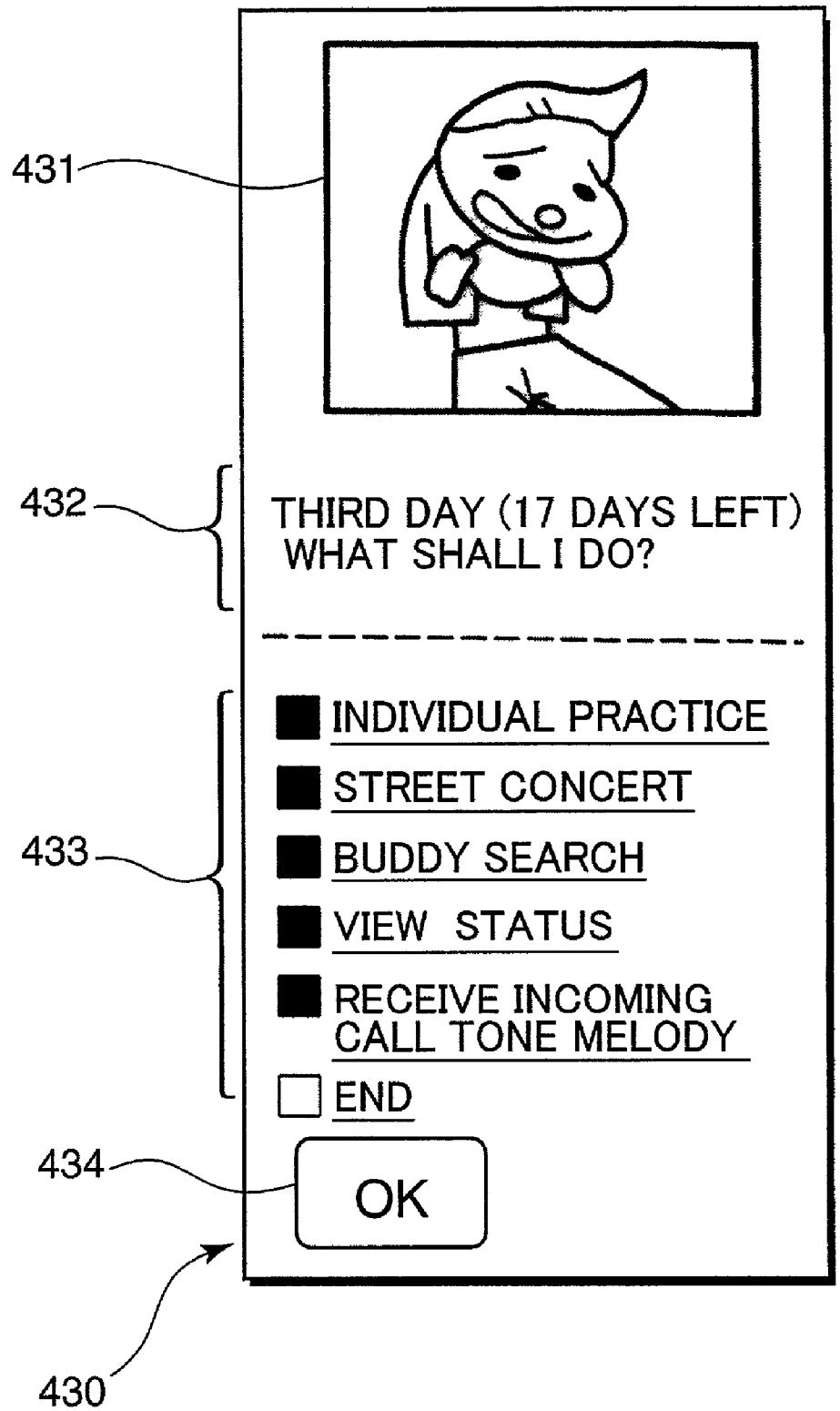
FIG. 11 is an example of a menu screen from which to select an activity.

FIG. 11 is an example of the menu screen from which to select the activity to be executed by the player during the individual activity period, which is selected from among such activities as 'Individual practice' and 'Street concert'. When a game is begun during the individual activity period, the menu screen 430 (or where an event occurs, the event display screen 420) is displayed. When part selection information is transmitted from the cellular telephone 2 to the game server 1, the game begins, the maximum 20-day individual activity period goes into effect, and the data for the menu screen 430 is read out from the event memory 150 by the game progress processor 100 is transmitted to and displayed on the cellular telephone 2.

The menu screen 430 comprises an image display area 431 in which is displayed an image indicating that the individual activity period is in effect, a period display area 432 in which is displayed the number of days that have elapsed since the beginning of the individual activity period, i.e., since the beginning of the game, as well as the number of days remaining in the individual activity period, an activity item display area 433 in which are displayed activity items available for selection, and an OK button 434 that is pressed after an activity item is selected. During the amateur band activity period (or during the professional band period), an image is displayed in the image display area indicating that the amateur band activity period (or the professional band period) is in effect, and a menu screen is displayed in which 'Buddy search' is omitted from the available activities and 'Chat with buddy' and 'Band menu' are added.

When the player selects an activity item from the menu screen 430 displayed on the cellular telephone 2 and presses the OK button 434, the activity item is transmitted from the cellular telephone 2 to the game server 1, and the subsequent screen corresponding to the activity item is displayed on the player's cellular telephone 2 by the game progress processor 100.

Figure 12:
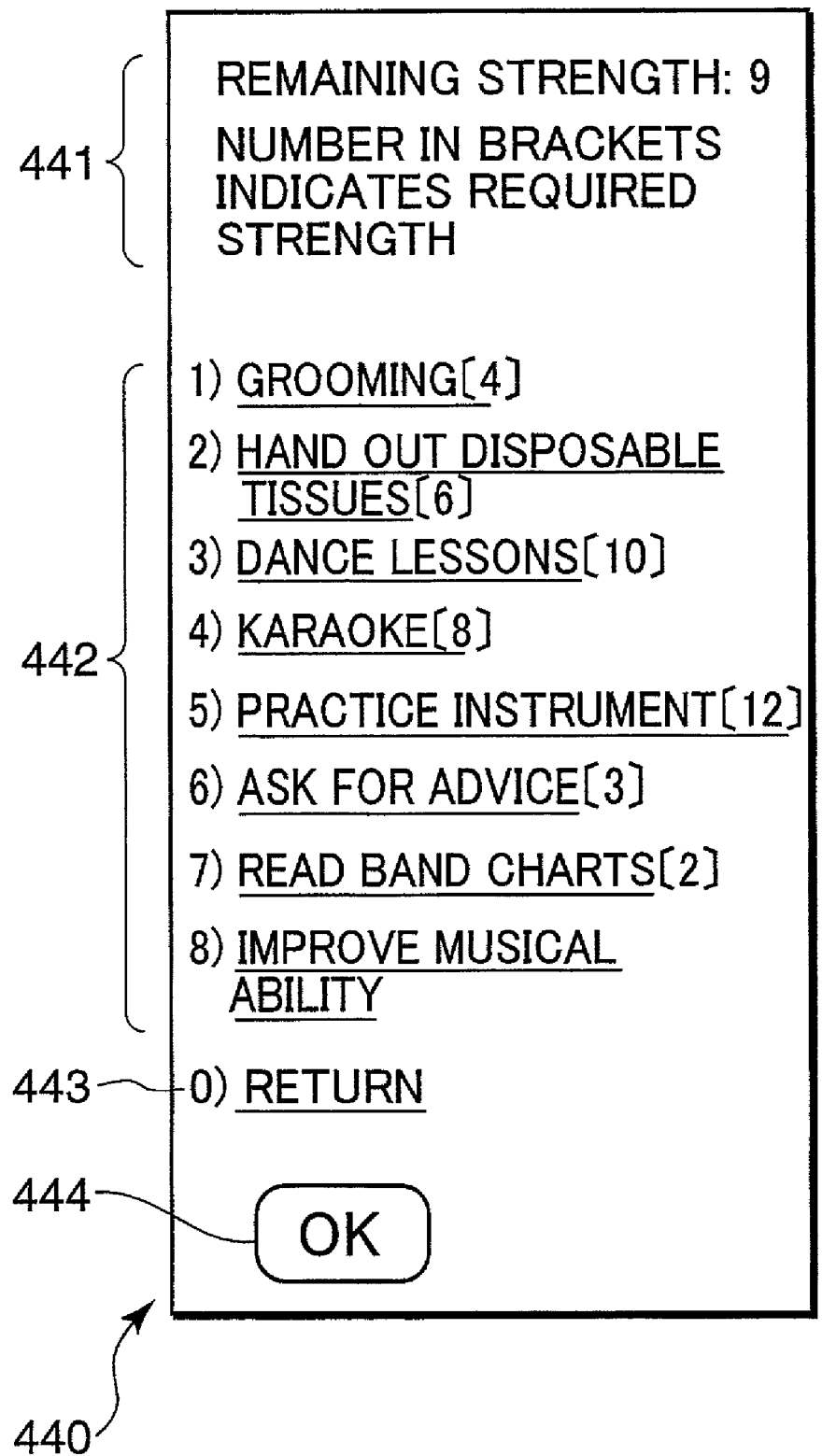
FIG. 12 is an example of an individual practice screen.

FIG. 12 is an example of an individual practice screen displayed on the player's cellular phone 2 when the activity item 'Individual practice' has been selected by the player from the menu screen. When the activity item 'Individual practice is transmitted from the cellular telephone 2 to the game server 1, the data for the individual practice screen is read out from the event memory 150 by the individual practice processor 105 is transmitted to and displayed on the cellular telephone 2.

The individual practice screen 440 comprises a physical strength display area 441 in which is displayed the amount of 'physical strength' remaining for that game day, an individual practice item display area 443 in which are displayed individual practice items and the amount of 'physical strength' required to perform each item, and an OK button 444 that is pressed when the selection of an individual practice item is completed. However, an individual practice item that requires an amount of 'physical strength' that exceeds the 'physical strength' remaining for that game day as displayed in the physical strength display area 441 cannot be selected.

When the player selects an individual practice item from the individual practice screen 440 displayed on the cellular telephone 2 and presses the OK button 444, the individual practice item is transmitted from the cellular telephone 2 to the game server 1, the data for the individual practice result display screen corresponding to the individual practice item is read out from the event memory 150 by the individual practice processor 105, and this data is transmitted to and displayed on the cellular telephone 2.

Figure 13:
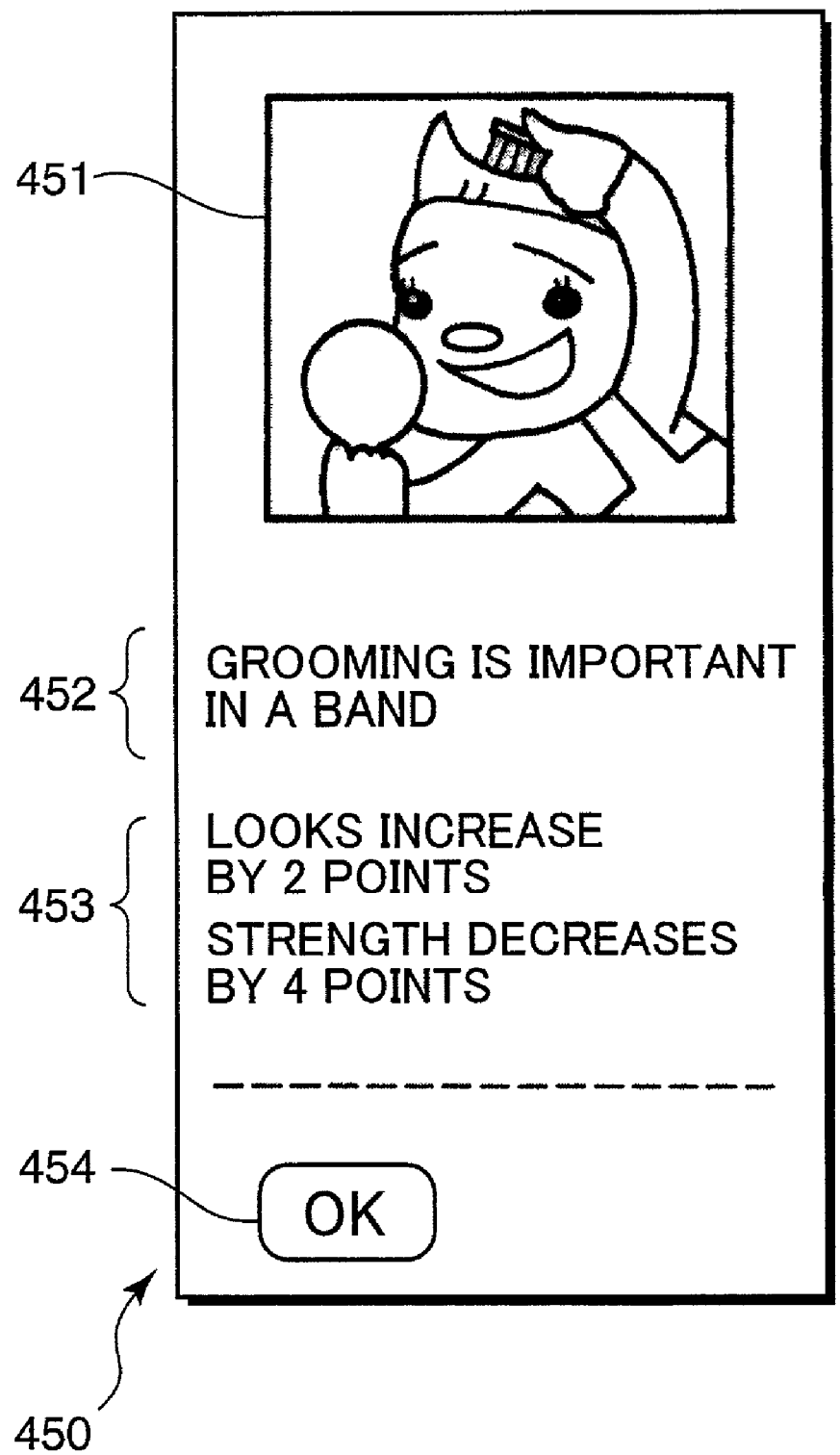
FIG. 13 is an example of an individual practice result display screen.

FIG. 13 is an example of an individual practice result display screen displayed on the player's cellular telephone 2 when the individual practice item 'Personal grooming' is selected by the player from the individual practice screen 440. When the individual practice item 'Personal grooming' is transmitted from the cellular telephone 2 to the game server 1, the data for the individual practice result screen is read out from the event memory 150 by the individual practice processor 105, and this data is transmitted to and displayed on the cellular telephone 2.

The individual practice result display screen 450 comprises an image display area 451 in which is displayed an image that indicates the contents of the individual practice item (here, 'Personal grooming'), an explanation display area 452 in which is displayed a description, explanation and the like of the individual practice item, an individual evaluation parameter display area 453 in which is displayed the changes in the player's individual evaluation parameters as a result of the performance of the individual practice item, and an OK button 454 that is pressed when confirmation of the individual practice result display screen 450 by the player is completed.

When the player completes confirmation of the contents of the individual practice result display screen 450 displayed on the cellular telephone 2 and presses the OK button 454, the confirmation of the individual practice result display screen 450 is transmitted from the cellular telephone 2 to the game server 1, the player's individual evaluation parameter values are updated in accordance with the individual practice items by the individual practice processor 105, and these values are transmitted to and stored in the database server 3. When the above processing is completed, the data for the menu screen is read out from the event memory 150 by the game progress processor 100, and this data is then transmitted to and displayed on the player's cellular telephone 2.

Figure 14:
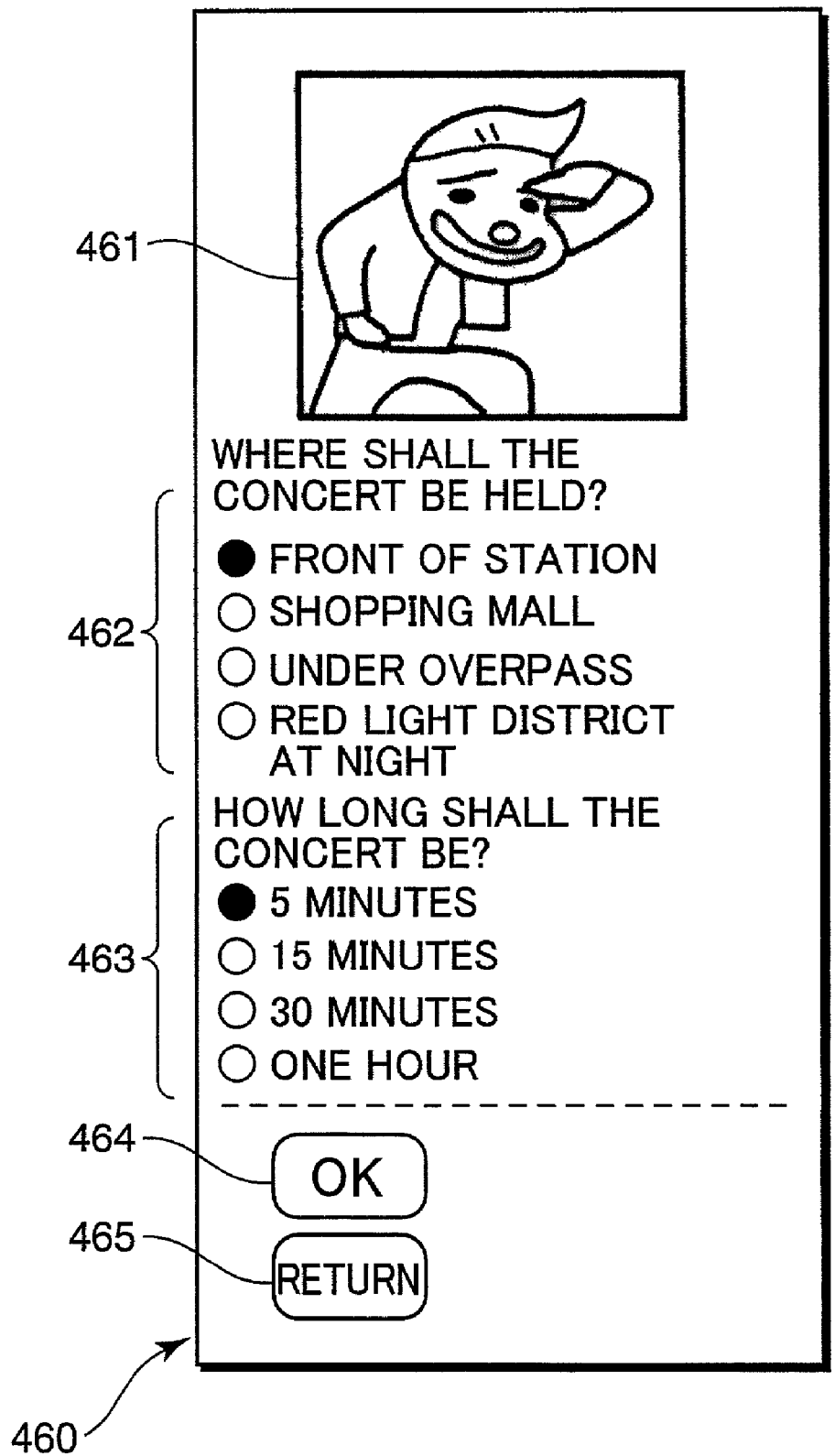
FIG. 14 is an example of a street concert screen.

FIG. 14 is an example of the street concert screen displayed on the player's cellular telephone 2 when the activity item 'Street concert' is selected by the player from the menu screen. When the activity item 'Street concert' is transmitted from the cellular telephone 2 to the game server 1, the data for the street concert screen is read out from the event memory 150 by the street concert processor 106, and this data is then transmitted to and displayed on the player's cellular telephone 2.

The street concert screen 460 comprises an image display area 461 in which is displayed an image indicating a street concert, a location selection area 462 in which to select a concert location from the four locations of 'Front of station', 'Shopping mall', 'Under overpass' or 'Red light district at night', a duration selection area 463 in which to select a concert duration from the four times of '5 minutes', '15 minutes', '30 minutes' and '1 hour', an OK button 464 that is pressed when confirmation of the location and duration of the concert is completed, and a return button 465 that is pressed when the player wishes to return to the menu screen.

When the player selects the location and duration of the concert from the street concert screen 460 displayed on the cellular telephone 2 and presses the OK button 464, the location and duration of the concert are transmitted from the cellular telephone 2 to the game server 1, the data for the street concert determination screen corresponding to the location and duration of the concert is read out from the event memory 150 by the street concert processor 106, and this data is then transmitted to and displayed on the player's cellular telephone 2. When the return button 465 is pressed, the pressing of the return button 465 is transmitted from the cellular telephone 2 to the game server 1, and the menu screen is read out from the event memory 150 by the street concert processor 106 and thereafter transmitted to and displayed on the cellular telephone 2.

Figure 15:
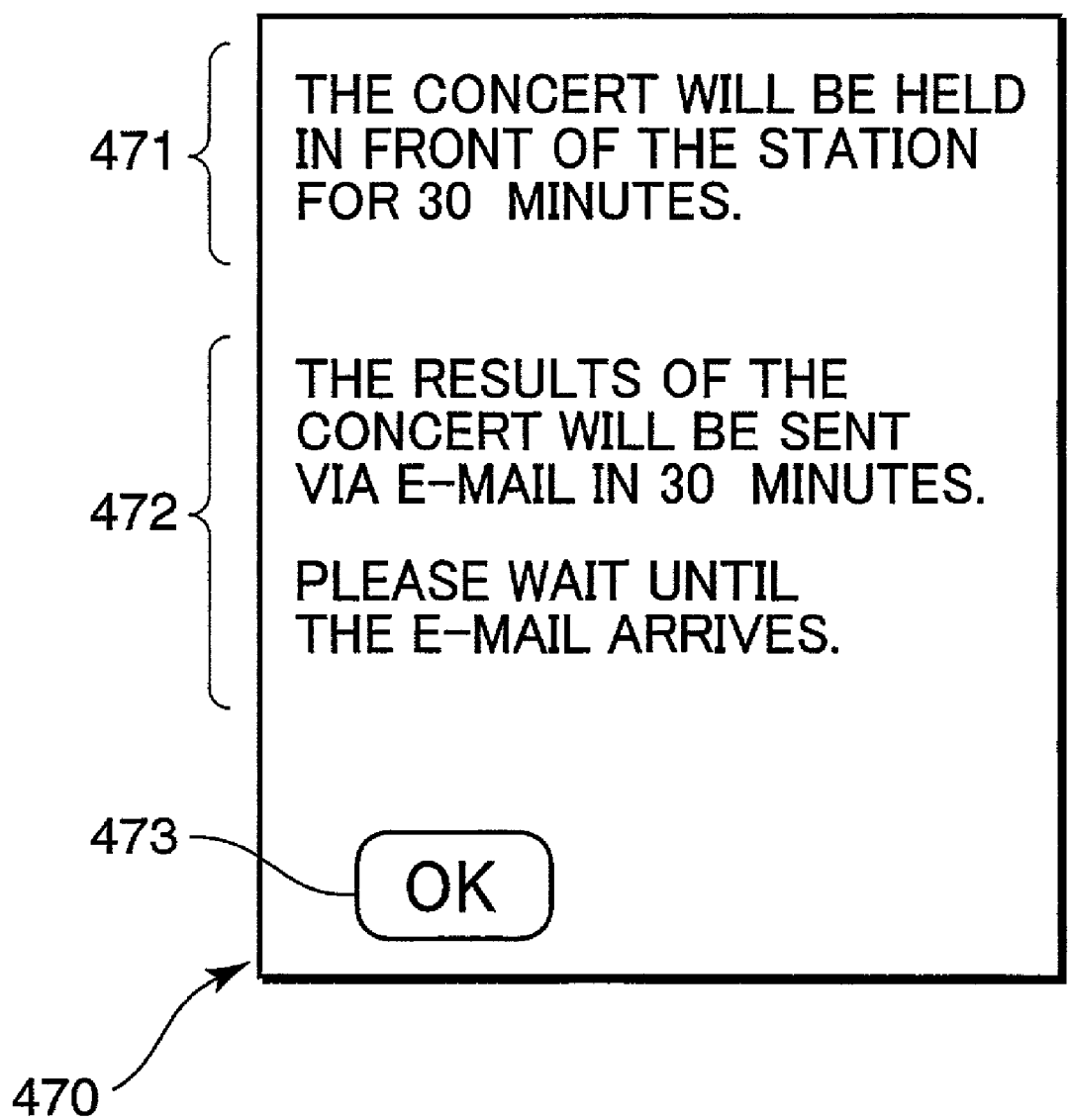
FIG. 15 is an example of a street concert determination screen.

FIG. 15 is an example of a street concert determination screen displayed on the player's cellular telephone 2 when the location and duration of the street concert are selected by the player from the street concert screen 460 and the OK button 464 is pressed. When the location and duration of the concert are transmitted from the cellular telephone 2 to the game server 1, the data for the street concert determination screen is read out from the event memory 150 by the street concert processor 106, and this data is transmitted to and displayed on the cellular telephone 2.

The street concert determination screen 470 comprises a duration/location display area 471 in which is displayed the location and duration of the concert selected from the street concert screen 460, a guidance area 472 in which guidance is displayed, and an OK button 473 that is pressed when the contents of the street concert determination screen 470 are confirmed by the player.

When the player confirms the contents of the street concert determination screen 470 displayed on the cellular telephone 2 and presses the OK button 474, the confirmation of the street concert determination screen 470 is transmitted from the cellular telephone 2 to the game server 1, and after the street concert duration selected from the street concert screen 470 has elapsed, the changes in the player's individual evaluation parameter values are transmitted in the form of an e-mail to the player's cellular telephone 2 by the street concert processor 106 as street concert results. When the OK button 474 is pressed, the confirmation of the street concert determination screen 470 is transmitted from the cellular telephone 2 to the game server 1, the data for the menu screen is read out from the event memory 150 by the street concert processor 106, and this data is transmitted to and displayed on the cellular telephone 2.

Figure 16:
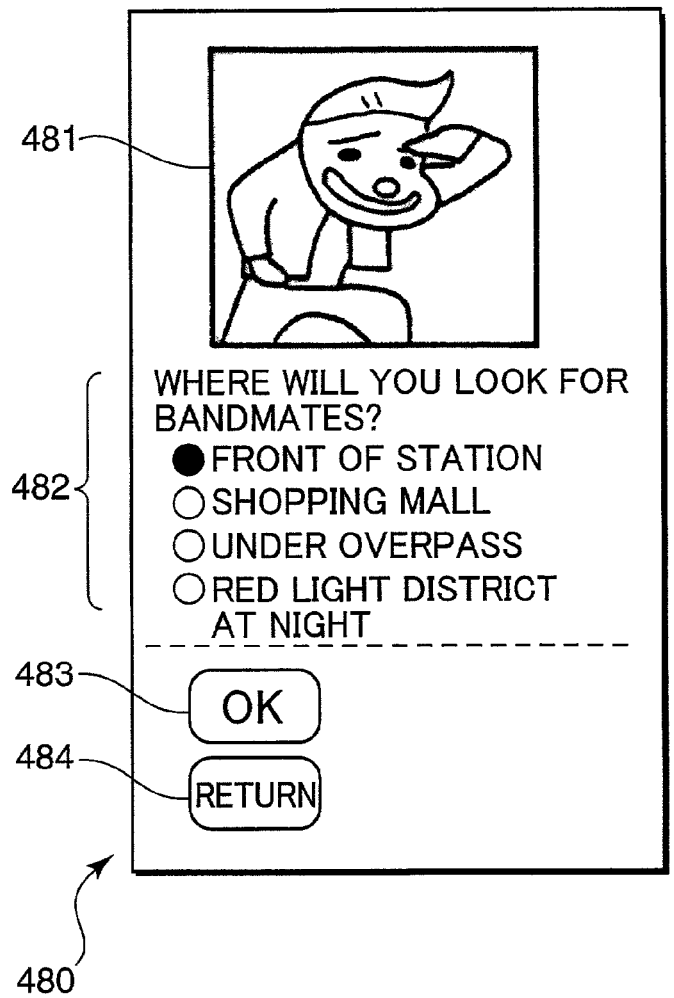
FIG. 16 is an example of a buddy search screen.

FIG. 16 is an example of the buddy search screen displayed on the player's cellular telephone 2 when the activity item 'Buddy search' is selected by the player from the menu screen 430 during the individual activity period. When the activity item 'Buddy search' is transmitted from the cellular telephone 2 to the game server 1, the data for the buddy search screen is read out from the event memory 150 by the buddy search processor 108 is transmitted to and displayed on the cellular phone 2.

The buddy search screen 480 comprises an image display area 481 in which is displayed an image that indicates a buddy search, a location selection area 482 in which the location of the buddy search is selected from among the four areas of 'Front of station', 'Shopping mall, 'Under overpass' or 'Red light district at night', an OK button 483 that is pressed when selection of the location of the buddy search is completed, and a return button 484 that is pressed when the player wishes to return to the menu screen 430.

When the player completes selection of a buddy search location from the buddy search screen 480 displayed on the cellular phone 2 and the OK button 483 is pressed, the buddy search location is transmitted from the cellular telephone 2 to the game server 1, the data for the buddy search determination screen corresponding to the buddy search location is read out from the event memory 150 by the buddy search processor 108, and this data is then transmitted to and displayed on the cellular telephone 2. If the return button 484 is pressed, the pressing of the return button 484 is transmitted from the cellular telephone 2 to the game server 1, the data for the menu screen 430 is read out from the event memory 150 by the buddy search processor 108 is transmitted to and displayed on the cellular telephone 2.

Figure 17:
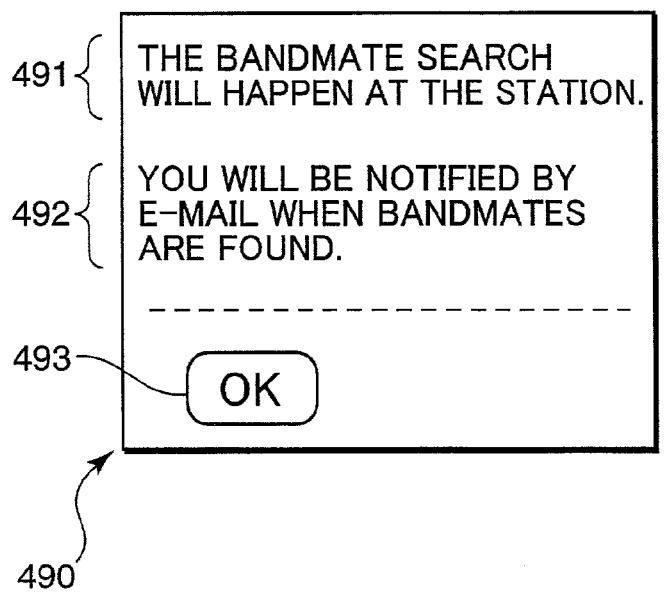
FIG. 17 is an example of a buddy search determination screen.

FIG. 17 is an example of the buddy search determination screen displayed on the player's cellular telephone 2 when the buddy search location is selected from the buddy search screen 480 and the OK button 483 is pressed by the player. When the location for the buddy search is transmitted from the cellular telephone 2 to the game server 1, the data for the buddy search determination screen is read out from the event memory 150 by the buddy search processor 108 is transmitted to and displayed on the cellular phone 2.

The buddy search determination screen 490 comprises a location display area 491 in which is displayed the buddy search location selected from the buddy search screen 480, a guidance display area 492 in which guidance is displayed, and an OK button 493 that is pressed when the contents of the buddy search determination screen 490 are confirmed by the player.

When the player confirms the contents of the buddy search determination screen 490 displayed on the cellular telephone 2 and the OK button 493 is pressed, the confirmation of the contents of the buddy search determination screen 490 is transmitted from the cellular telephone 2 to the game server 1. The buddy search processor 108 then searches at prescribed time intervals during the individual activity period for three other players who (i) are executing a 'Buddy search', (ii) selected the same buddy search location, and (iii) can form a four-member band including the player (i.e., three other players that have different part information from the player). Where suitable buddies are found as a result of the buddy search, the identifying information (such as an authentication ID that identifies the cellular telephone 2) that identifies the cellular telephone 2 of each of the four members that will comprise the band is associated together as a team by the buddy search processor 108 and stored in the member information memory 170. The 'band name', as well as the nicknames, part information and other information regarding the members of the band, are transmitted to the player's cellular telephone 2 in the form of an e-mail. If buddies are not found within the individual activity period, an incoming call tone melody is determined by the incoming call tone melody creation processor 110 based on the values of the player's individual evaluation parameters, the incoming call tone melody is transmitted to the cellular telephone 2, and the game ends.

Figure 18:
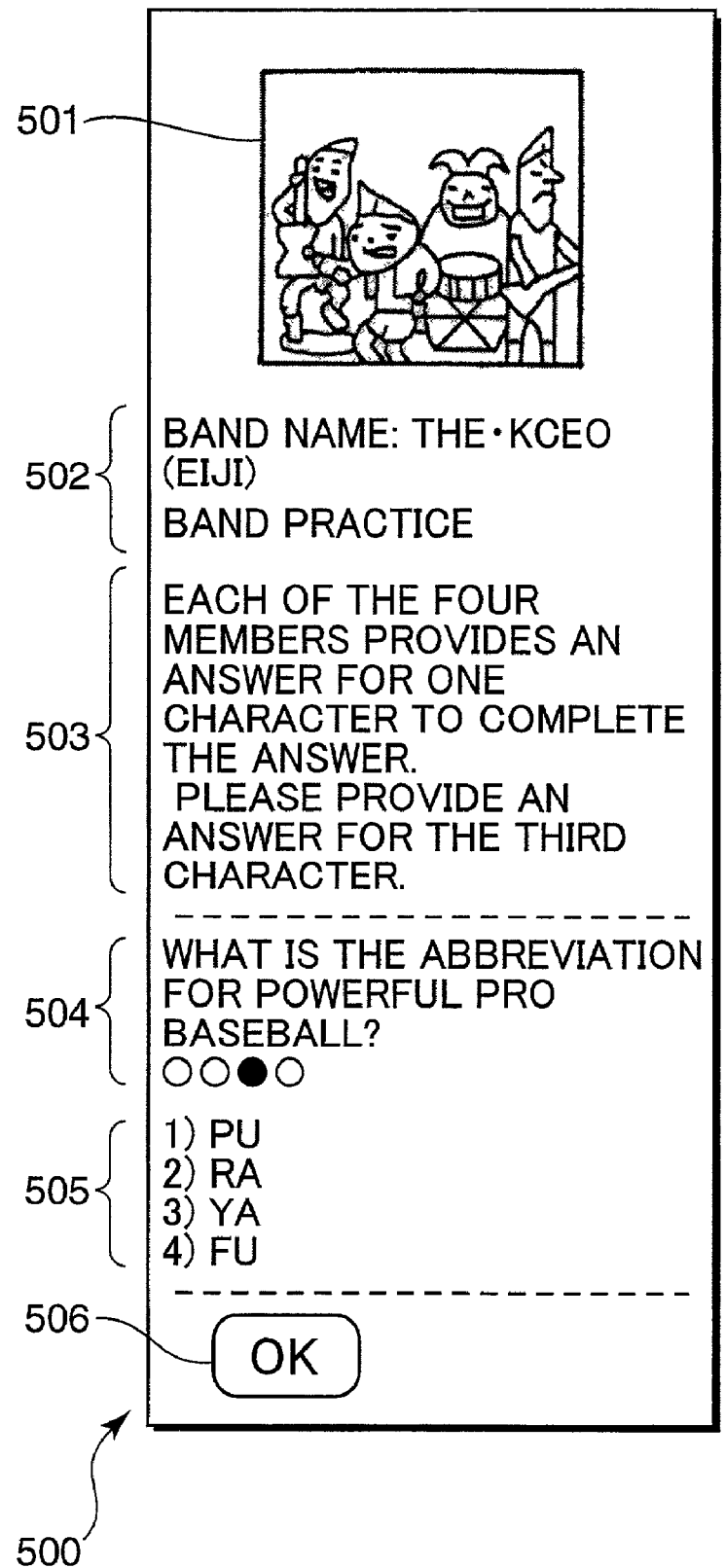
FIG. 18 is an example of a team event display screen.

FIG. 18 is an example of the team event display screen displayed when a team event (band practice) is executed during the amateur band activity period or the professional band activity period. During the period between the time that the player executes a 'Buddy search' and finds buddies and the time that the game ends, i.e., during the amateur band activity period or the professional band activity period, the team event display screen data for a team event selected randomly from among team events is read out from the event memory 150 by the event execution processor 103 and is transmitted to the cellular telephone 2 of each member of the team.

The team event display screen 500 comprises an image display area 501 in which is displayed an image that indicates the nature of the team event, a band name display area 502 in which the band name is displayed, a guidance area 503 in which guidance is displayed, a quiz display area 504 in which a question comprising the event is displayed, a choices display area 505 in which the choices for the answer to the question are displayed, and an OK button 506 that is pressed after the player completes selection from among the choices.

Here, the question displayed in the quiz display area 504 is a question that requires all of the members of the band to cooperate in answering the question, thereby giving a role to each of the members. Specifically, the first through fourth characters of an answer comprising the same number of characters (here, four characters) as the number of persons in the band (four persons) must be answered by the respective four members of the band, and the event evaluation processor 104 evaluates whether or not the four characters obtained as a result are correct.

The description in this embodiment involved a situation in which each of the members of the band was required to provide an answer for one character, but it is also acceptable if each member is required to provide an answer for two or more characters. In this case, the total number of characters of the answer equals the number of characters obtained by multiplying the number of characters answered by each member by the number of band members. It is also acceptable if each member of the band is required to provide an answer for a different number of characters depending on his or her part. In this case, the total number of characters assigned to the various parts comprises the total number of characters of the answer.

When the player completes selection from the choices display area 505 and the OK button 504 is pressed, the choice information is transmitted from the cellular telephone 2 to the game server 1 and is temporarily stored therein. When all of the members of the band complete their answers (i.e., when the OK button 504 is pressed by all of the members), the player's individual evaluation parameter values are updated by the event evaluation processor 104 based on the answer results from all members of the band, and these values are transmitted to and stored in the database server 3.

Figure 19:
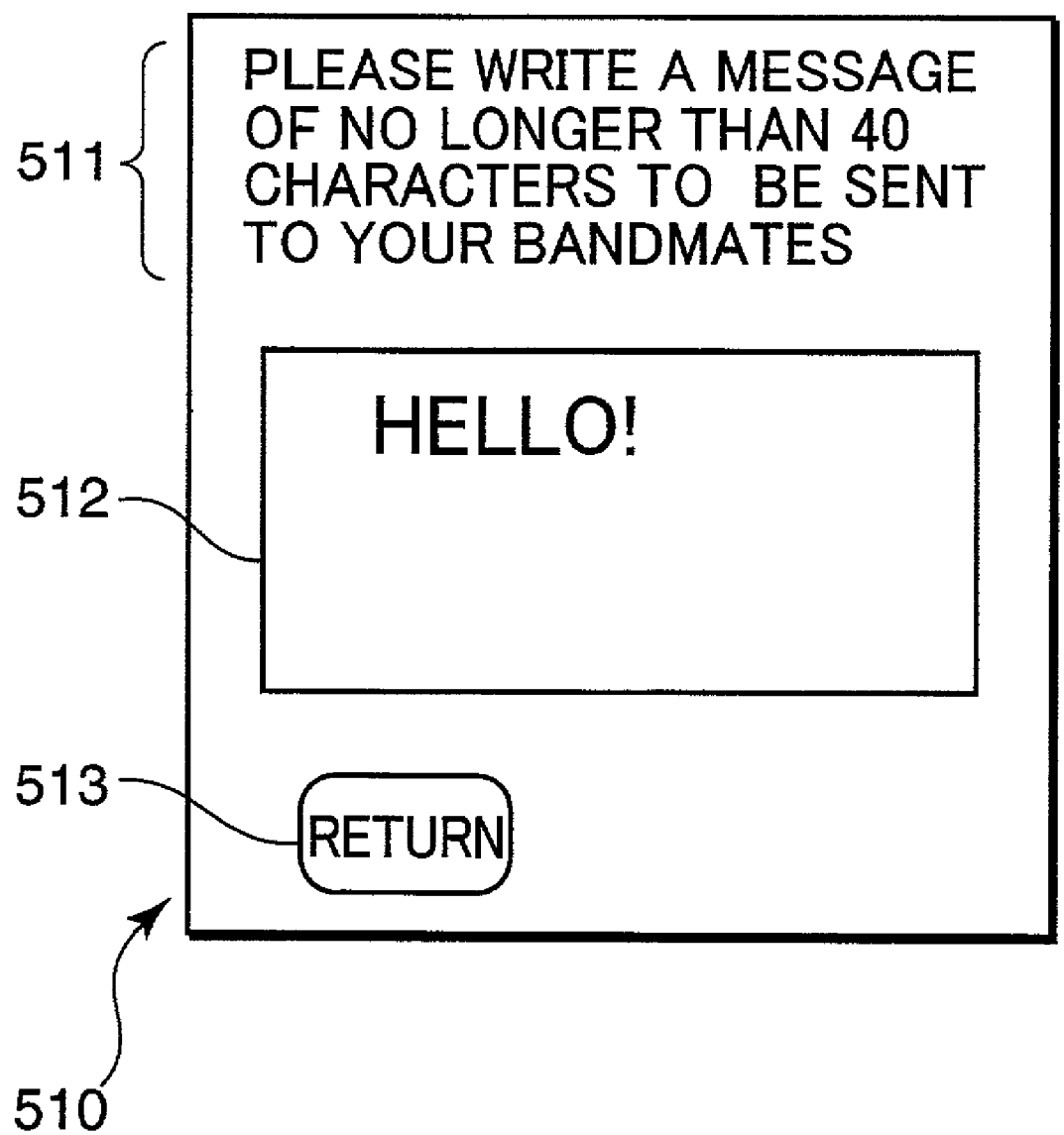
FIG. 19 is an example of a chat input screen.

FIG. 19 is an example of the chat input screen displayed when 'Chat with buddy' is selected from the menu screen during the amateur band activity period or the professional band activity period. When the player selects 'Chat with buddy' from the menu screen during the amateur band activity period or the professional band activity period, the data for the chat input screen is read out from the event memory 150 by the buddy chat processor 107 and is then transmitted to and displayed on the cellular telephone 2.

The chat input screen 510 comprises a guidance display area 511 in which guidance is displayed, a message input area 512 in which a message to be conveyed to the buddies comprising the band is entered, and a send button 513 that is pressed after the player completes entry of the message.

When the player completes entry of the message and the send button 513 is pressed, the entered message information is transmitted from the cellular telephone 2 to the game server 1, and is then transmitted by the buddy chat processor 107 as an e-mail to the cellular telephone 2 of each of the members of the band to which the player who entered the message belongs (except the band member who entered the message).

Where 'Status' is selected from the menu screen 430, a status screen is displayed from which the player can check on the player's own status or the status of the other members of the team. In this status screen are displayed values for individual evaluation parameters such as the player's 'pitch', 'rhythm', or 'looks', enabling the player to check on the abilities of the other members and decide whether or not to execute member deletion or member replacement processing with reference to this status information.

In addition, the answers of the other members to the quiz question displayed in the quiz display area 504 can be viewed or transmitted as an e-mail.

In this way, the player can learn the thinking of the other members regarding the game, and can decide whether or not to execute member deletion or member replacement processing accordingly. Moreover, the player can also learn the thinking of the other members through an exchange of e-mails with the other players on the team via the buddy chat processor 107.

Figure 20:
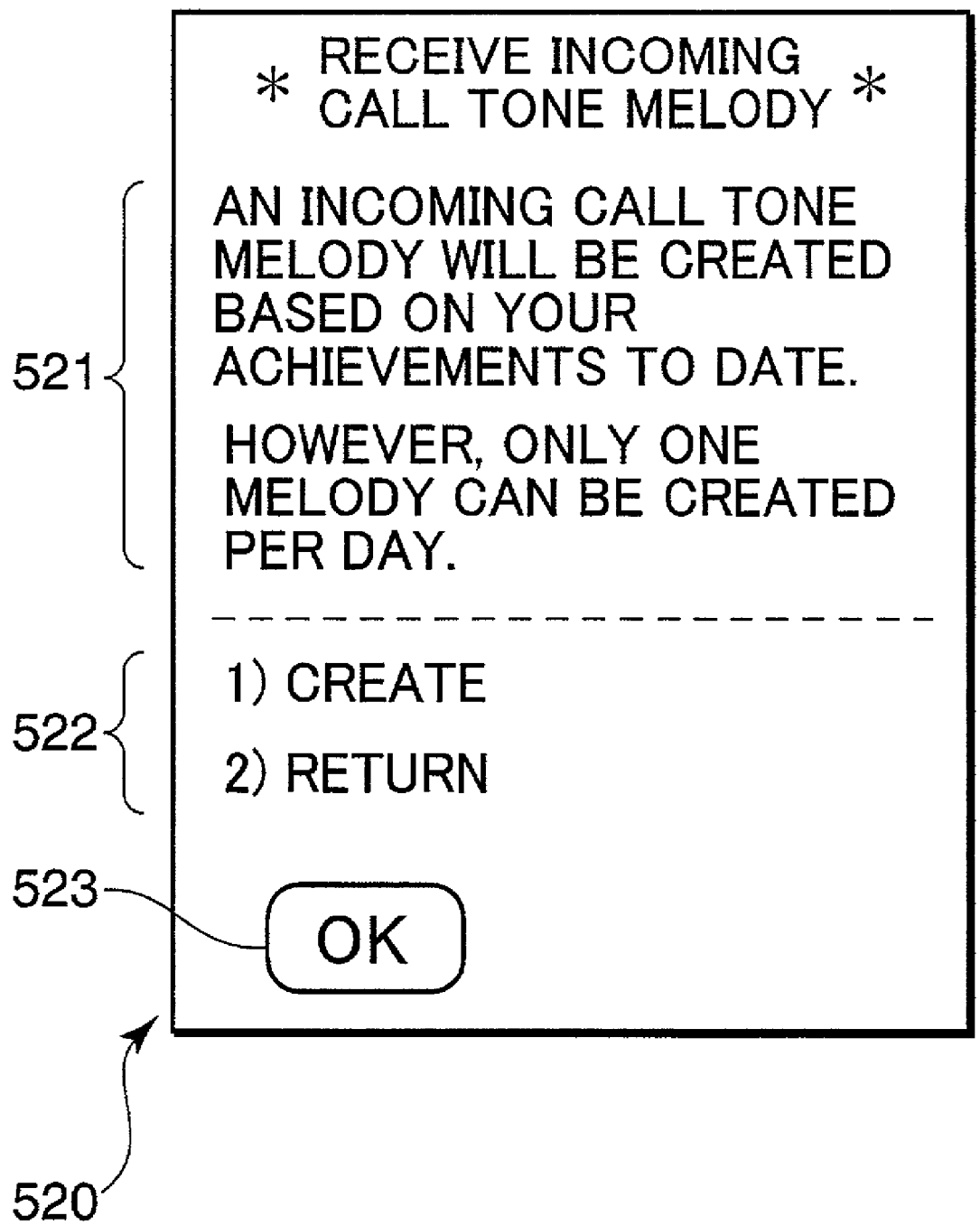
FIG. 20 is an example of an incoming call tone melody receipt screen.

FIG. 20 is an example of the incoming call tone melody receipt screen displayed when 'Receive incoming call tone melody' is selected from the menu screen. When the player selects 'Receive incoming call tone melody' from the menu screen, the data for the incoming call tone melody receipt screen is read out from the event memory 150 by the incoming call tone melody creation processor 110 and is transmitted to and displayed on the player's cellular telephone 2.

The incoming call tone melody receipt screen 520 comprises a guidance display area 521 in which guidance is displayed, a selection area 522 in which the player selects whether or not to receive an incoming call tone melody, and an OK button 523 that is pressed after this selection is completed.

When the player selects 'Create' and presses the OK button 523, the selection indicating creation of an incoming call tone melody is transmitted from the cellular telephone 2 to the game server 1, an incoming call tone melody is selected by the incoming call tone melody creation processor 110, and after the data for the incoming call tone melody is read out from the incoming call tone melody memory 160 and arrangement processing is carried out with regard to the read-out incoming call tone melody (referred to as the 'basic melody'), the post-arrangement incoming call tone melody is transmitted from the game server 1 to the cellular telephone 2. Here, incoming call tone melody selection is determined based on the player's individual evaluation parameter values (the higher the player's individual evaluation parameter values, the higher the ranking of the incoming call tone melody selected), and the nature of the arrangement processing performed with regard to the selected incoming call tone melody is also determined based on the player's individual evaluation parameter values (the higher the player's individual evaluation parameter values, the less elaborate the arrangement). On the other hand, if the player selects 'Return' and presses the OK button 523, an instruction to return to the menu screen is transmitted from the cellular telephone 2 to the game server 1, and the data for the menu screen is read out from the event memory 150 by the incoming call tone melody creation processor 110 and is transmitted to and displayed on the cellular telephone 2.

FIGS. 21A through 21D show examples of the arrangement processing performed by the incoming call tone creation processor 110. FIG. 21A is the basic melody, FIG. 21B is the result of arrangement processing of the basic melody where the player's individual evaluation parameter value for the 'musical sense' parameter is low, FIG. 21C is the result of arrangement processing of the basic melody where the player's individual evaluation parameter value for the 'rhythm' parameter is low, and FIG. 21D is the result of arrangement processing of the basic melody where the player's individual evaluation parameter value for the 'endurance' parameter is low. Where the 'pitch' parameter value is low, the basic melody is arranged so that the pitch is off, where the 'rhythm' parameter value is low, the basic melody is arranged so that the length of the notes is off, and where the 'endurance' parameter value is low, the basic melody is arranged so that the melody piece is short.

The present invention enables a player on a team to propose that members of a band operating as the team be changed during the amateur band activity period or professional band activity period described above. A member deletion request proposed from a cellular telephone 2 belonging to a member of a team is received, this member deletion request is transmitted to the other members of the team, each member's response to this transmitted member deletion request is selected from among the possible responses of, for example, 'Agree' and 'Disagree', and a determination regarding approval of the proposal is made based on the principle of majority vote. The principle of majority vote means that the determination of whether or not the request is approved or denied is made based on the opinion of the majority of the team members. In other words, if the number of members who 'Agree' exceeds the number of members who 'Disagree', the member deletion request is deemed approved, and that member is removed from the team. Next, a member replacement request (a new member admission request) from a cellular telephone 2 urging the admission of a new member is received, this member replacement request is transmitted to the other members of the team, each member's response to this transmitted member replacement request is selected from among the possible responses of 'Agree' and 'Disagree', and a determination regarding approval of the proposal is made based on the principle of majority vote. In other words, if the number of members who 'Agree' exceeds the number of members who 'Disagree', a player who is not registered to the team is added to the team. Members of a team are replaced in this fashion.

Figure 22:
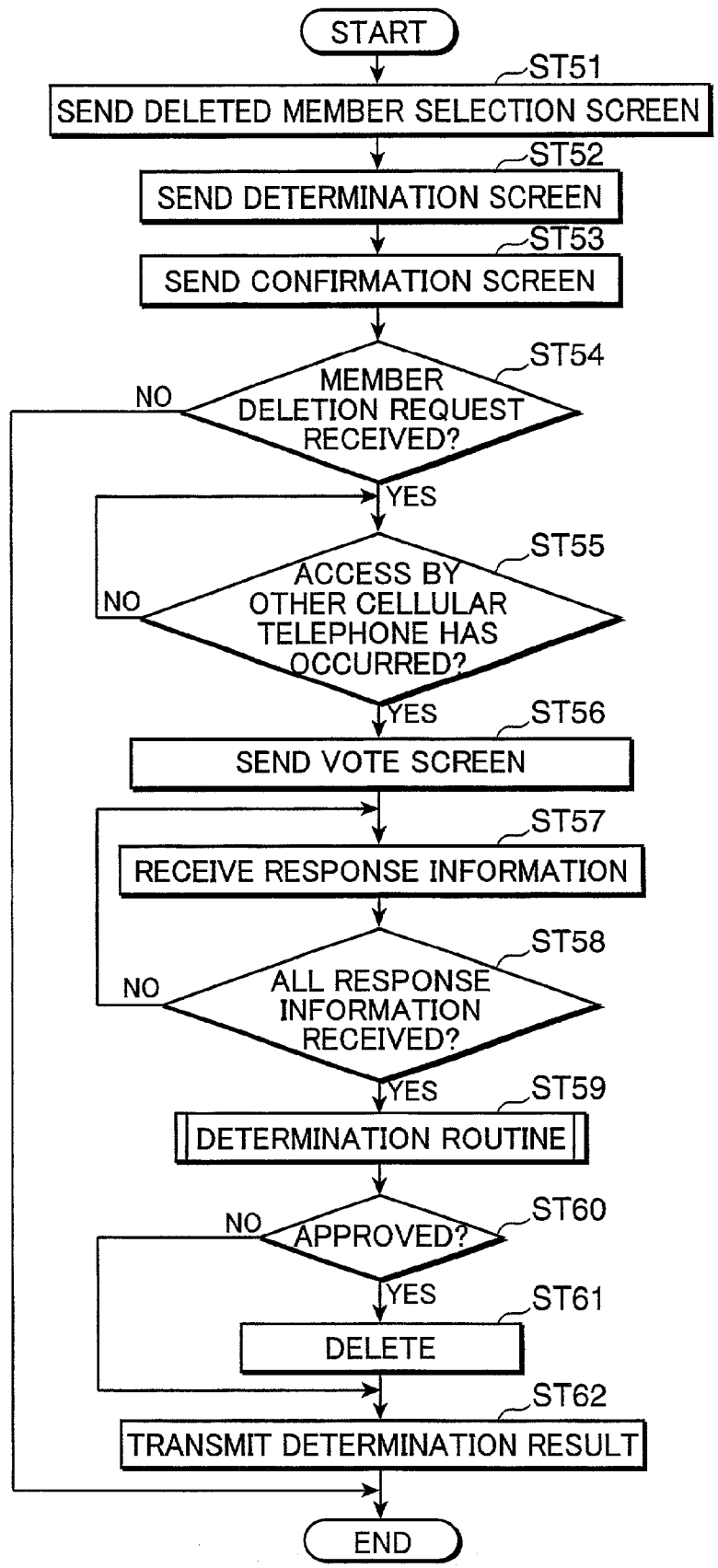
FIG. 22 is a flow chart showing the member information deletion routine sequence.
Figure 23:
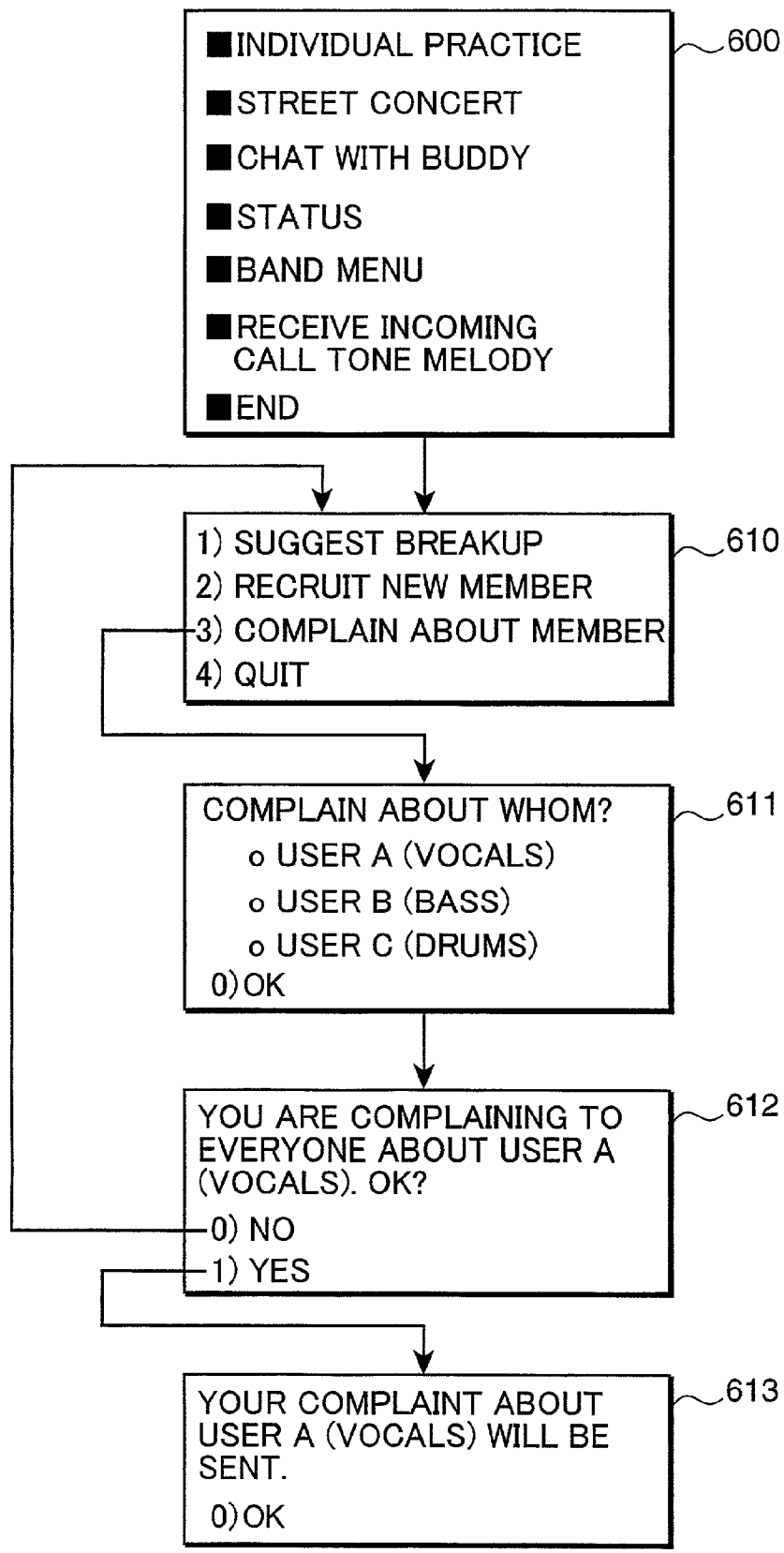
FIG. 23 is an example of the series of screens displayed when 'Complain about member' is selected from the band menu screen.
Figure 24:
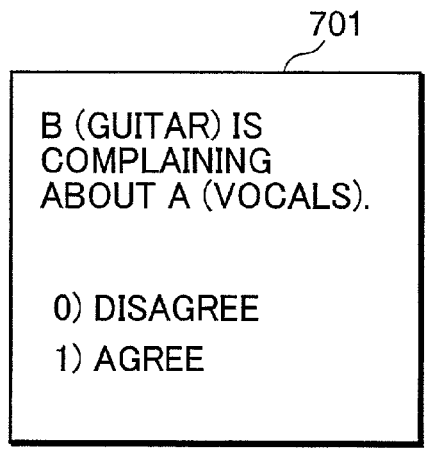
FIG. 24 is an example of a screen transmitted to a cellular telephone.
Figure 25:
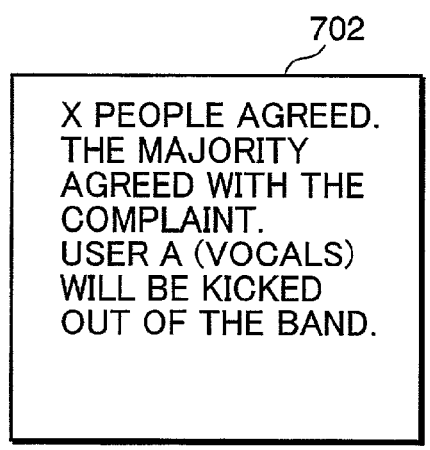
FIG. 25 is an example of a screen transmitted to a cellular telephone.
Figure 26:
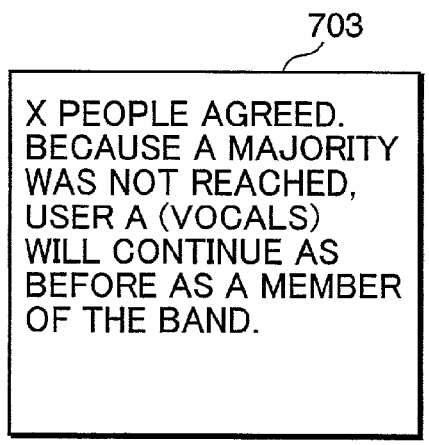
FIG. 26 is an example of a screen transmitted to a cellular telephone.

FIG. 22 is a flow chart showing the sequence of the member information deletion routine, FIG. 23 is an example of an image cycling where 'Complain about member' is selected from the band menu screen 610, and FIGS. 24 through 26 are examples of screens transmitted to the cellular telephones 2.

First, when the main menu screen 600 shown in FIG. 23 is displayed by the game progress processor 100 and 'Band menu' is selected from this main menu screen 600, the band menu screen (request item selection screen) 610 is displayed. If 'Complain about member' is selected from the band menu screen 610, the deleted member selection screen 611 is transmitted by the member information deletion processor 111 to the cellular telephone 2 (ST51), and is displayed on the monitor 202 of the cellular telephone 2. In this deleted member selection screen 611, a display is shown by which to complain about a member. Here, items to enable the player to select the member the player wants to delete, such as 'User A (vocals)', 'User B (bass)' and 'User C (drums)' are displayed, and the player's selection is received. If any of the items is selected, the determination screen 612 is transmitted by the member information deletion processor 111 (ST52) and displayed on the monitor 202. The determination screen 612 is a screen that is transmitted when 'User A (vocals)' is selected from the deleted member selection screen 611, and here, if 'No' is selected, the routine ends and the screen reverts to the band menu screen 610. If 'Yes' is selected here, the confirmation screen 613 by which the contents displayed on the determination screen 612 are confirmed are transmitted to the cellular telephone 2 by the member information deletion processor 111 (ST53) and displayed on the monitor 202. A member deletion request is then transmitted from the cellular telephone 2 to the game server 1 and the screen reverts to the band menu screen 510. When the game server 1 receives the member deletion request (YES in ST54), if the next time other members access the game (YES in ST55), the vote screen 701 (FIG. 24) is transmitted to each of the other members (ST56). The vote screen 701 is displayed on the monitor 202 of each cellular telephone 2, and either 'Disagree' or 'Agree' is selected by each player and received as response information by the game server 1 (ST57). When all of the response information is received by the game server 1 (YES in ST58), an approval/denial determination routine is carried out by the member information deletion processor 111 (ST59). This determination routine is deemed to result in approval where the number of cellular telephones 2 selecting 'Agree' exceeds the number of cellular telephones 2 selecting 'Disagree' (YES in ST60), and upon receiving this approval response, the member information deletion processor 111 deletes the identifying information for that cellular telephone 2 from the member information memory 170 (ST61). If the number of cellular telephones 2 selecting 'Disagree' exceeds the number of cellular telephones 2 selecting 'Agree' in step ST60 (NO in ST60), approval is not deemed to result (NO in ST60), and the member information deletion processor 111 advances to step ST63. For a situation in which the number of 'Agree' and 'Disagree' responses are equal in the determination routine of step ST59, the winning response can be set beforehand, and in this embodiment, it is set as 'Disagree' (not approved). The result of the determination is then transmitted to all of the members of the band by the e-mail transmission unit 116 (ST62). FIGS. 25 and 26 are examples of e-mail screens notifying the players of the determination result. The approval screen 702 is a screen displayed on the monitors 202 where the member deletion request has passed, while the denial screen 703 is a screen displayed on the monitors 202 where the member deletion request has been denied.

Figure 27:
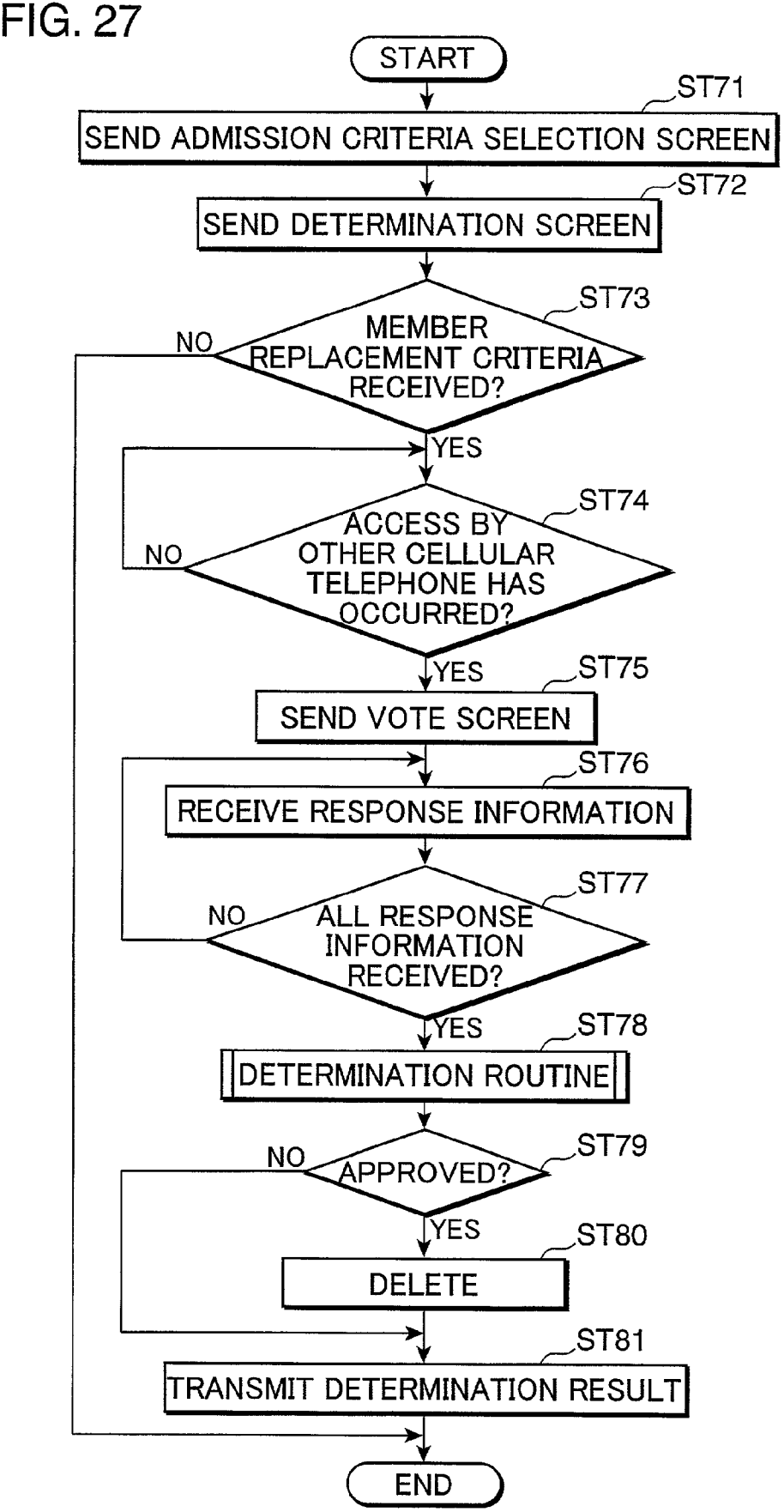
FIG. 27 is a flow chart showing the member replacement routine sequence.
Figure 28:
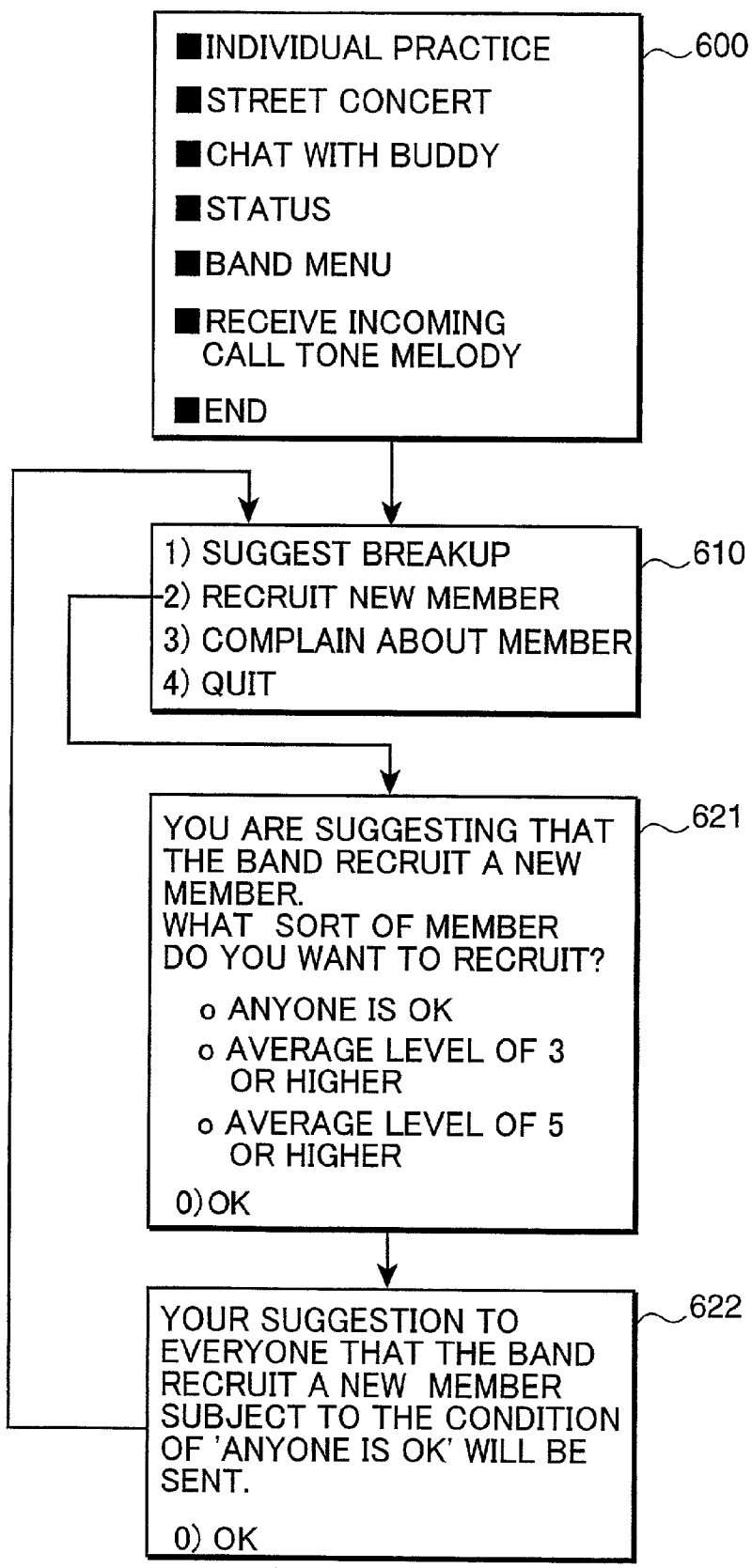
FIG. 28 is an example of the series of screens displayed when 'Recruit new member' is selected from the band menu screen.

FIG. 27 is a flow chart showing the sequence of the member replacement routine, FIG. 28 is an example of the screen cycling carried out when 'Recruit new member' is selected from the band menu screen 610, and FIGS. 29 through 31 are examples of screens transmitted to the cellular telephones 2.

First, when 'Recruit new member' is selected from the band menu screen 610 in FIG. 28, the admission criteria selection screen 621 is transmitted to the cellular telephone 2 by the member replacement processor 112 (ST71) and displayed on the monitor 202. This admission criteria selection screen 621 displays the fact that a new member is being sought. Here, the displayed admission criteria required for the new member may include such criteria as 'Anyone is OK', 'Average level of 3 or higher', or 'Average level of 5 or higher', and the player's selection thereof is received. When one of the items is selected, the determination screen 622 is transmitted by the member replacement processor 112 (ST72). The determination screen 622 is a screen transmitted when 'Anyone is OK' is selected from the admission criteria selection screen 621, and where 'OK' is thereupon selected, the confirmation of the contents displayed in the determination screen 622 is transmitted from the cellular telephone 2 to the game server 1, and the screen returns to the band menu screen 610. When the game server 1 receives a member replacement request (YES in ST73), if the next time other members access the game (YES in ST74), the vote screen 711 (FIG. 29) is transmitted to each of these other members (ST75). The vote screen 711 is displayed on the monitor 202 of each cellular telephone 2, each player responds by selecting either 'Disagree' or 'Agree', and the response information is received by the game server 1 (ST76). When all of the response information is received by the game server 1 (YES in ST77), an approval/denial determination routine is carried out by the member replacement processor 112 (ST78). This determination routine is deemed to result in approval where the number of cellular telephones 2 selecting 'Agree' exceeds the number of cellular telephones 2 selecting 'Disagree' (YES in ST79), and upon receiving this approval response, the member replacement processor 112 selects a cellular telephone 2 that satisfies the admission criteria and stores the identifying information for the selected cellular telephone 2 in the member information memory 170 (ST80). Here, when a cellular telephone 2 that satisfies the admission criteria is selected, the cellular telephone 2 that used to belong to that team but was deleted therefrom by the member information deletion processor 111 in the member information memory 170 will not be selected once more. If the number of cellular telephones 2 selecting 'Disagree' exceeds the number of cellular telephones 2 selecting 'Agree' in step ST79 (NO in ST79), approval is not deemed to result (NO in ST79), and the member replacement processor 112 advances to step ST81. For a situation in which the number of 'Agree' and 'Disagree' responses are equal in the determination routine of step ST78, the winning response can be set beforehand, and in this embodiment, if the number of 'Agree' and 'Disagree' responses are equal, the winning response is set as 'Disagree' (not approved). The result of the determination is then transmitted to all of the members of the team by the e-mail transmission unit 116. FIGS. 30 and 31 are examples of e-mail screens notifying the players of the determination result. The approval screen 712 is a screen displayed on the monitors 202 where the member replacement request has passed, while the denial screen 713 is a screen displayed on the monitors 202 where the member replacement request has been denied.

Figure 32:
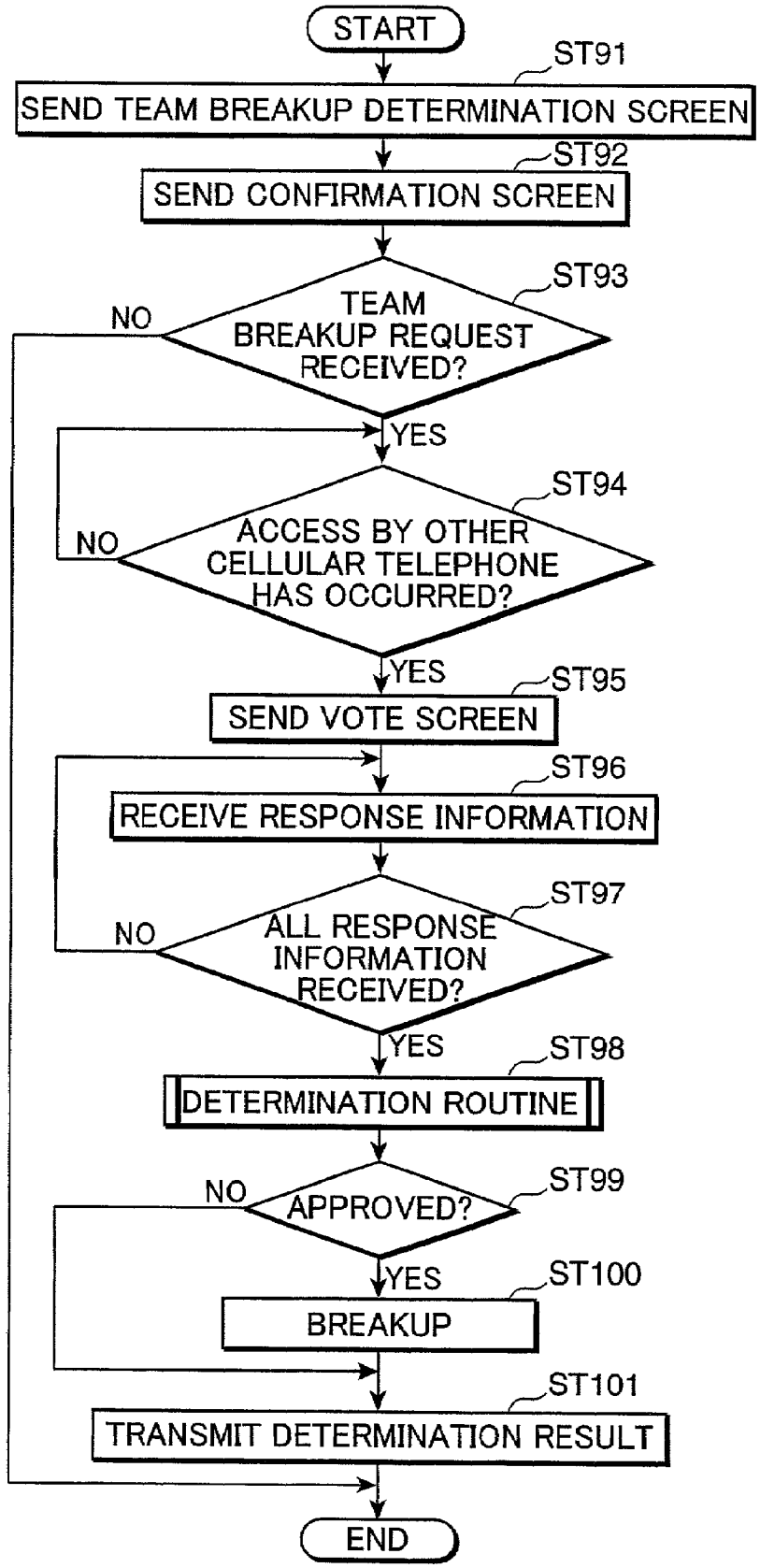
FIG. 32 is a flow chart showing the team breakup routine sequence.
Figure 33:
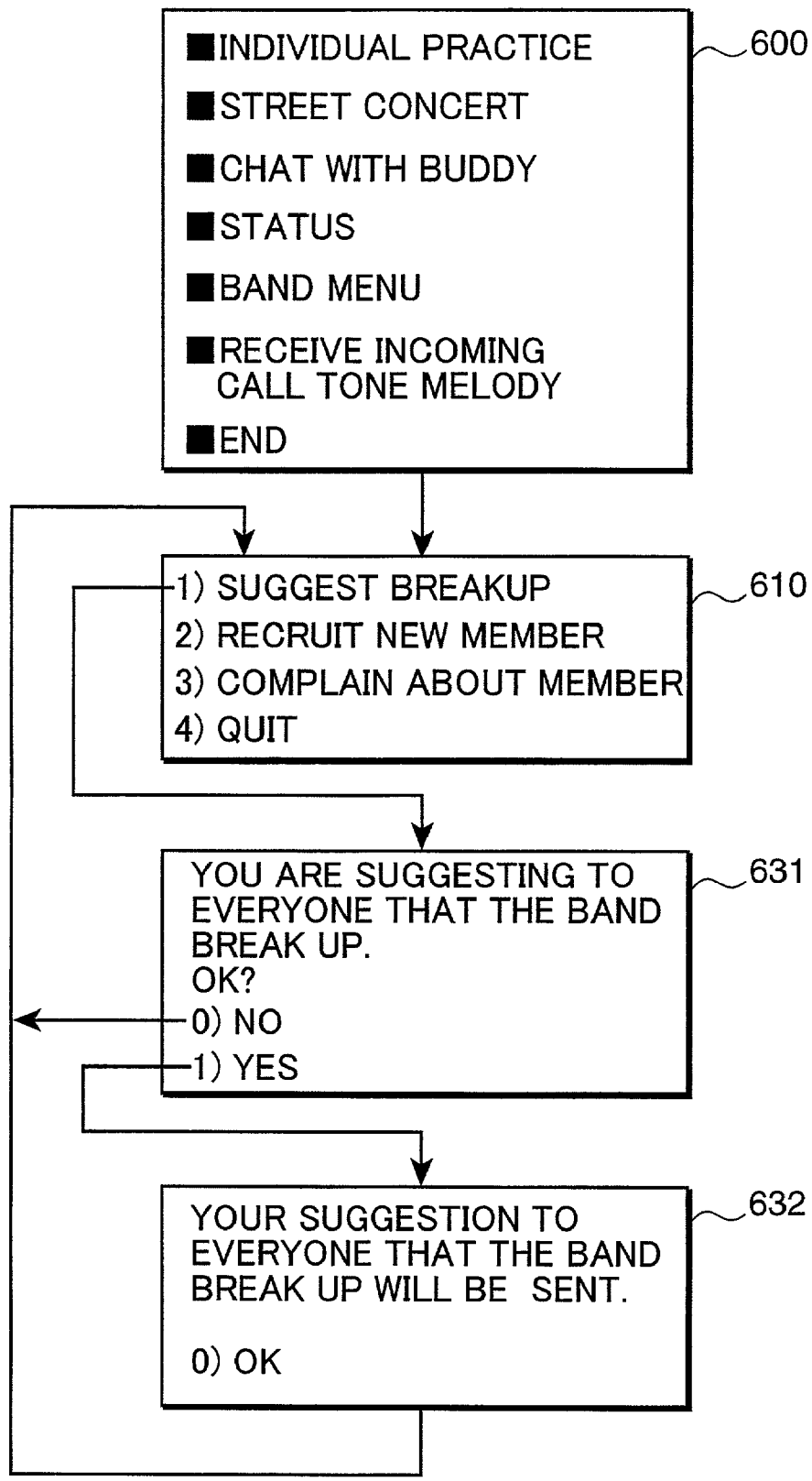
FIG. 33 is an example of the series of screens displayed when 'Suggest breakup' is selected from the band menu screen.
Figure 34:
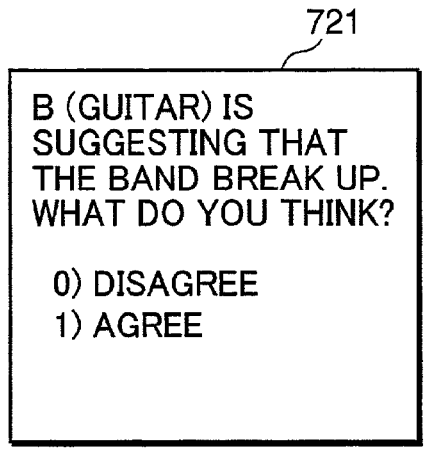
FIG. 34 is an example of a screen transmitted to a cellular telephone.
Figure 35:
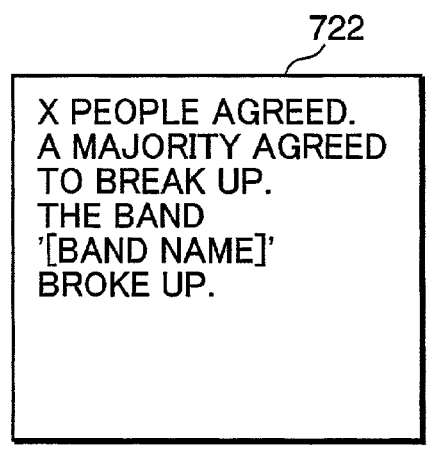
FIG. 35 is an example of a screen transmitted to a cellular telephone.
Figure 36:
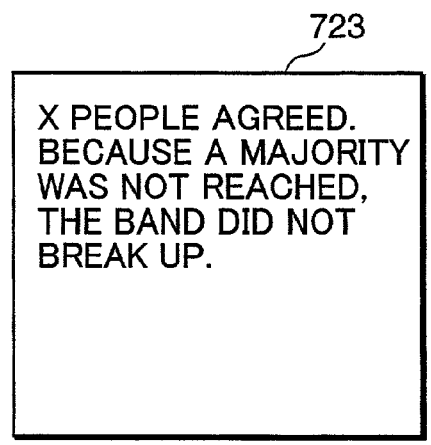
FIG. 36 is an example of a screen transmitted to a cellular telephone.

FIG. 32 is a flow chart showing the sequence of the team breakup routine, FIG. 33 is an example of the screen cycling that occurs when 'Suggest breakup' is selected from the band menu screen 610, and FIGS. 34 through 36 are examples of screens transmitted to the cellular telephones 2.

First, when 'Suggest breakup' is selected from the band menu screen 610 in FIG. 33, the team breakup determination screen 631 is transmitted to the cellular telephone 2 by the team breakup processor 113 (ST91) and displayed on the monitor 202. This team breakup determination screen 631 displays a screen seeking confirmation regarding the suggestion that the band break up. Here, if 'No' is selected, and the screen returns to the band menu screen 610. If 'Yes' is selected, the confirmation screen 532 is transmitted by the team breakup processor 113 (ST92) and displayed on the monitor 202. If 'OK' is selected from the confirmation screen 632, the confirmation of the contents displayed in the determination screen 632 is transmitted from the cellular telephone 2 to the game server 1, and the screen returns to the band menu screen 610. When the game server 1 receives a team breakup request (YES in ST93), the vote screen 721 (see FIG. 34) is transmitted (ST95) to each of the other members the next time they access the game. The vote screen 721 is displayed on the monitor 202 of each cellular telephone 2, each player responds by selecting either 'Disagree' or 'Agree', and the response information is received by the game server 1 (ST96). When all of the response information from the cellular telephone 2 is received by the game server 1 (YES in ST97), an approval/denial determination routine is carried out by the team breakup processor 113 (ST98). This determination routine is deemed to result in approval where the number of cellular telephones 2 selecting 'Agree' exceeds the number of cellular telephones 2 selecting 'Disagree' (YES in ST99), and upon receiving this approval response, the team breakup processor 113 deletes the identifying information for the cellular telephones 2 of all of the team members from the member information memory 170 (ST100). If the number of cellular telephones 2 selecting 'Disagree' exceeds the number of cellular telephones 2 selecting 'Agree' in step ST99, approval is not deemed to result (NO in ST99), and the team breakup processor 113 advances to step ST101. For a situation in which number of 'Agree' and 'Disagree' responses are equal in the determination routine of step ST98, the winning response can be set beforehand, and in this embodiment, if the number of 'Agree' and 'Disagree' responses are equal, the winning response is set as 'Disagree' (not approved). The result of the determination is then transmitted to the cellular telephones of all the members of the team by the e-mail transmission unit 116 (ST101). FIGS. 35 and 36 are examples of e-mail screens notifying the players of the determination result. The approval screen 722 is a screen displayed on the monitors 202 where the team breakup request has passed, while the denial screen 723 is a screen displayed on the monitors 202 where the team breakup request has been denied.

Figure 37:
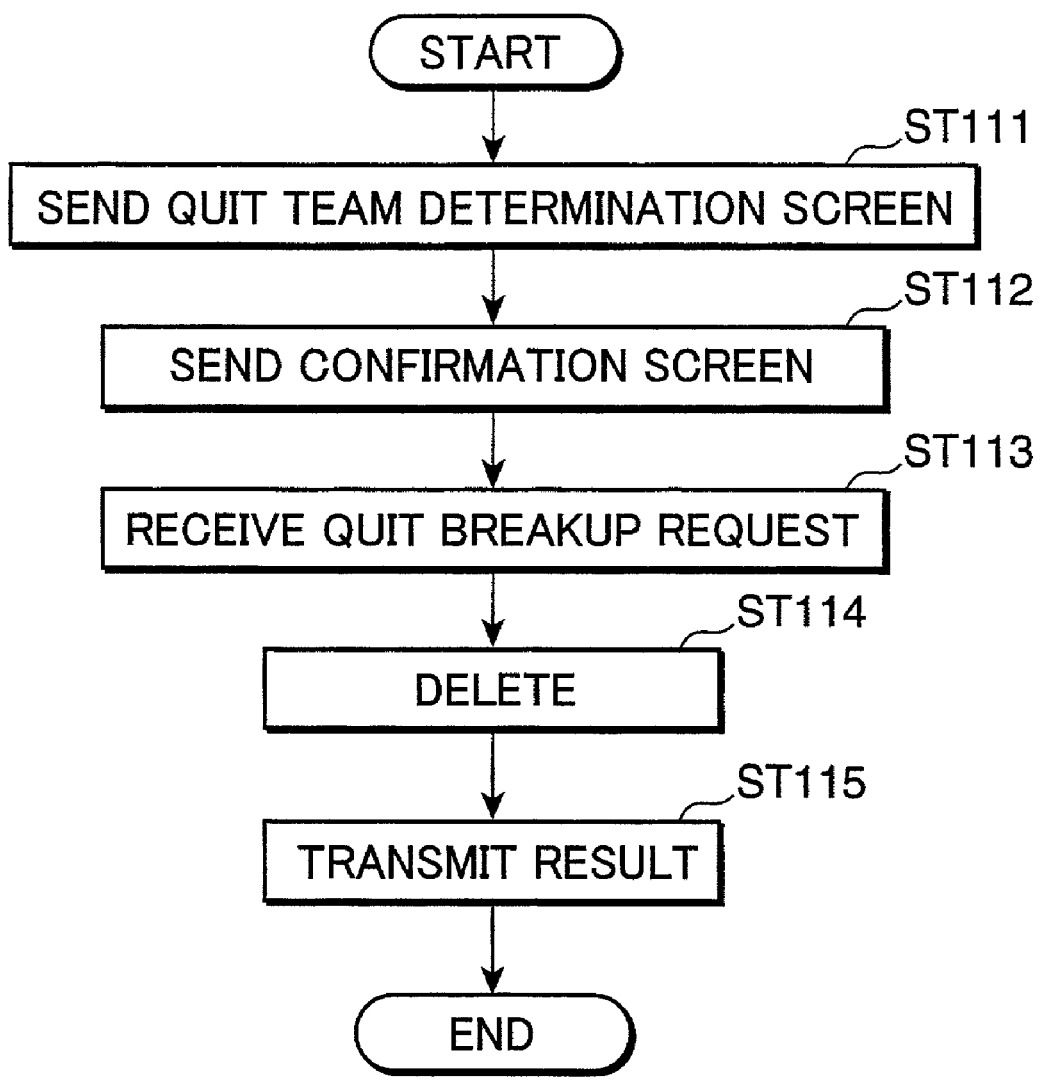
FIG. 37 is a flow chart showing the quit team routine sequence.
Figure 38:
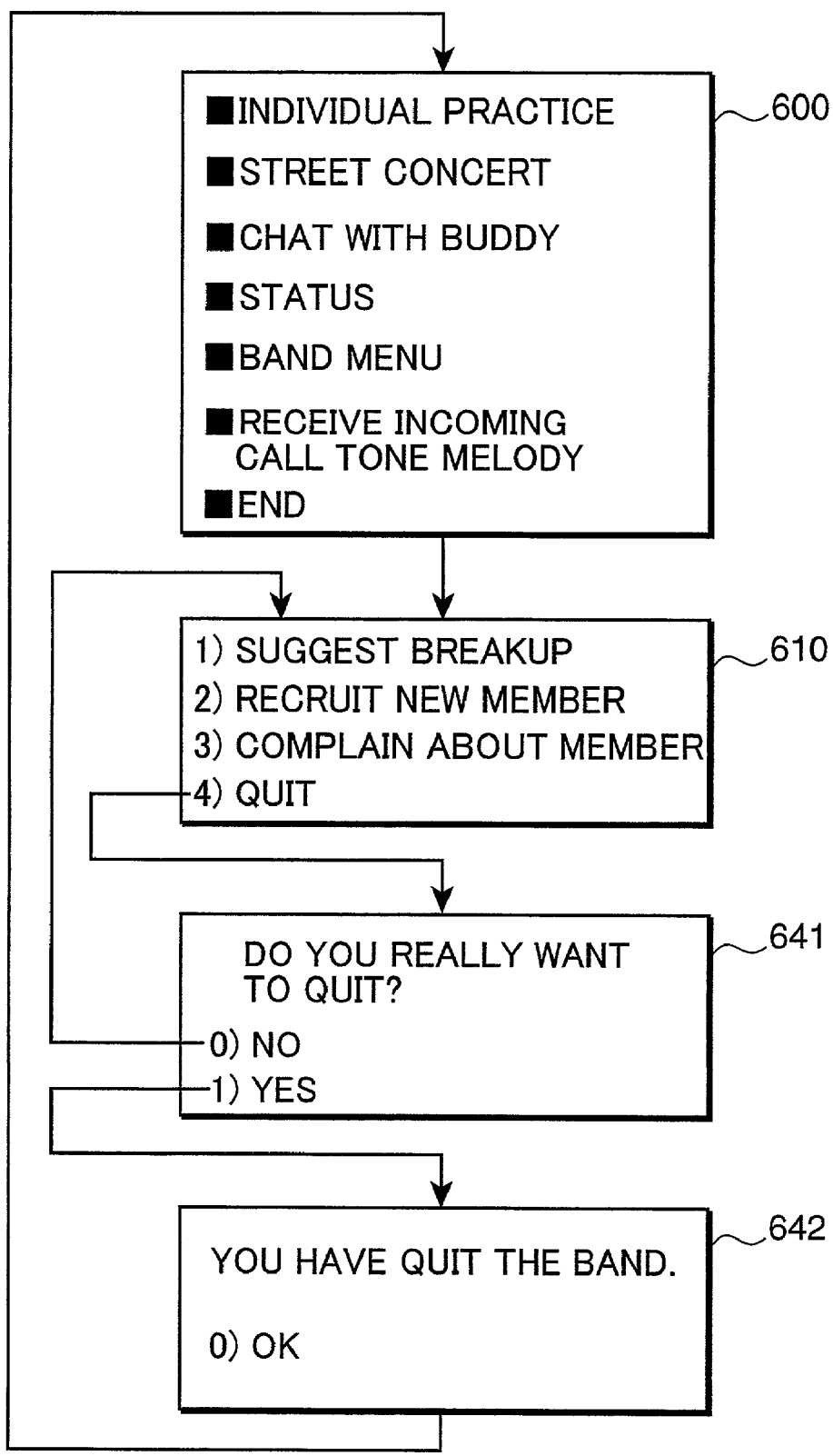
FIG. 38 is an example of the series of screens displayed when 'Quit' is selected from the band menu screen.
Figure 39:
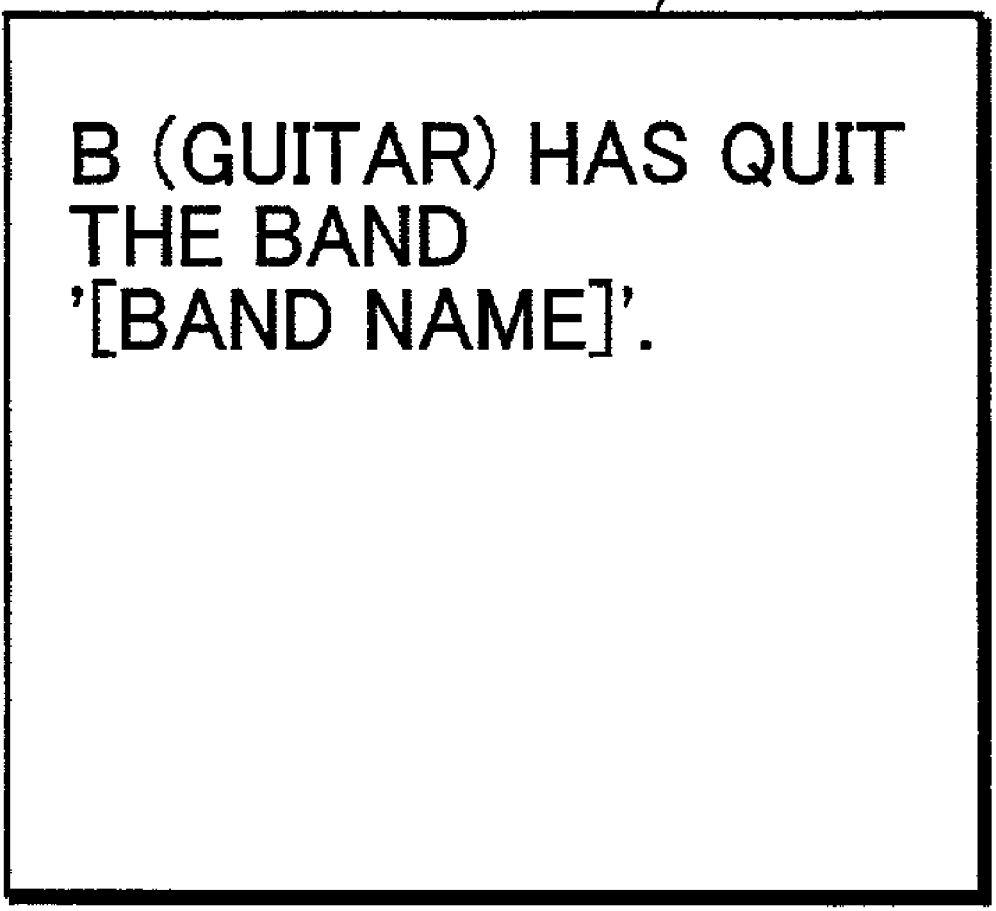
FIG. 39 is an example of a screen transmitted to a cellular telephone.

FIG. 37 is a flow chart showing the sequence of the quit team routine, FIG. 38 is an example of the screen cycling that occurs when 'Quit team' is selected from the band menu screen 610, and FIG. 39 is an example of the screen transmitted to the cellular telephones 2.

First, when 'Quit team' is selected from the band menu screen 610 in FIG. 38, the quit team determination screen 641 is transmitted to the cellular telephone 2 by the quit team processor 114 (ST111), and a message seeking confirmation that the player wishes to quit the team is displayed in the quit team determination screen 641. If 'No' is selected here, the screen returns to the band menu 610. If 'Yes' is selected, the player is deemed to quit the band of which he or she has been a member and the determination screen 642 is transmitted by the quit team processor 114 (ST112). If 'OK' is selected here, the confirmation of the contents displayed on the confirmation screen 642 is transmitted from the cellular telephone 2 to the game server 1 (ST113), and the screen returns to the band menu screen 610. The quit team processor 114 then deletes the identifying information for that cellular telephone 2 from the member information memory 170 (ST114). In this case, responses are not sought from the other members, and the e-mail screen 731 (FIG. 39) on which the fact that the player has quit the team is sent in the form of an e-mail to the other members of the band by the e-mail transmission unit 141 (ST115).

The present invention may also be employed in various applications as described below.

(A) This embodiment described a situation in which a band was formed as a team, but the present invention may also be applied in a game in which the team comprises a chorus or a baseball or soccer team, or any other game in which multiple terminal devices comprise a single team. In this case, a more versatile network game can be provided.

(B) This embodiment described a situation in which the selection and arrangement of an incoming call tone melody were determined based on the player's individual evaluation parameter values, but it is also acceptable if only one of these processes is performed. Where only the selection of an incoming call tone melody is performed, the arrangement process becomes unnecessary. Where only the arrangement process is performed with regard to an incoming call tone melody, the capacity of the memory used to store the incoming call tone melody can be reduced.

(C) This embodiment described a situation in which one incoming call tone melody was provided, but it is also acceptable if two or more incoming call tone melodies are provided. In this case, the number of melodies provided based on the player's individual evaluation parameter values can also be changed, which increases the complexity of the game and makes it more interesting.

(D) This embodiment described a situation in which the terminal device comprised a mobile communication device, particularly a cellular telephone 2, but the present invention is not limited to this implementation, and terminal device may also comprise a personal computer or other apparatus that is equipped with a modem connected to a network (wired or wireless) such as public telephones, the Internet or e-mail, as well as with a monitor and key operation unit. In the case of a personal computer, image information that is compressed in JPEG or other format can be transmitted and received, enabling the amount of game data to be increased, thereby increasing the applicability of the present invention in various types of games.

(E) This embodiment described a situation in which the player's proposals involved selection from among multiple choices, but the present invention is not limited to this implementation, and it is also acceptable if the player inputs text directly. In this case, the complexity of the game increases, making the game more interesting.

In summary, the present invention relates to a game server that transmits and receives information to and from a plurality of terminal devices over a network. The game server of this invention comprises: a memory; member information processing means for associating identifying information regarding three or more terminal devices and for storing the associated information as a team; member information deletion means for transmitting a member deletion request regarding one terminal device belonging to the team from the another one of said terminal devices belonging to said team to the other terminal devices belonging to said team and for deleting the identifying information of said one of the terminal device from said memory based on the responses from each terminal device in regard to said member deletion request; and member replacement means for transmitting a member admission request from one terminal device belonging to said team to the other terminal devices belonging to said team, selecting a terminal device that does not belong to said team and satisfies admission criteria included in said member admission request based on the responses from the other terminal devices to said member admission request, and for storing the identifying information regarding the selected terminal device in said memory as a member of said team.

According to the aforementioned structures, identifying information regarding three or more terminal devices from among a plurality of terminal devices previously registered as members is associated together and stored in a prescribed memory as a team. A member deletion request is transmitted from one terminal device belonging to the team regarding which identifying information is associated together, to the terminal devices of the other members to the team, seeking deletion of another terminal device stored in the memory as a member of the team. Based on the responses of each terminal device to this member deletion request, the identifying information regarding the other terminal device is deleted from the memory. Following this deletion processing, a member admission request seeking the admission of a new terminal device as a member of the team to replace the terminal device deleted from the memory is sent by a terminal device belonging to the team to the other terminal devices belonging to the team. Based on the responses of each terminal device to this member admission request, a terminal device that satisfies the admission criteria included in the member admission request is selected from among terminal devices that are not registered in the memory and do not belong to the team, and the identifying information regarding the selected terminal device is stored in the memory as a team member. In this way, a player having a different game intention or a player with a low skill level can be removed from the team and a new member having the same game intention or a member with a high skill level can be admitted to the team. Accordingly, a member having a different game intention or a member with a low skill level can be removed from the team and a new member can be admitted to the team. In this way, the members comprising the team can be replaced, such that the game may be played with members having the same game intentions, making the game more interesting.

The above described server may further include reference means that enables reference to the game histories of the other terminal devices belonging to the team. According to this construction, players can refer to the game histories of the other members of the team, such as the skill levels assigned to each player on the team. Accordingly to the invention described, because the game histories of other members of the team can be consulted, they can be referred to when deleting players as members.

In the above described invention, the member information deletion means can be set to carry out the determination regarding whether or not to grant the member deletion request based on the principle of majority vote. According to this construction, because the determination regarding whether or not to grant a member deletion request is made based on the principle of majority vote, the desires of team members can be reflected in a member deletion determination. Accordingly, because desires of team members can be reflected in a member deletion determination, the game is made more interesting.

In the above described invention, the member replacement means can be set to carry out the determination regarding whether or not to grant a new member admission request based on the principle of majority vote. According to this construction, because the determination regarding whether or not to grant a member replacement request (the new member admission request) is made based on the principle of majority vote, the desires of team members can be reflected in a member replacement determination. Accordingly, because desires of team members can be reflected in a member replacement determination, the game is made more interesting.

The invention described above may further include an e-mail transmission means that transmits the result of a determination to the terminal devices belonging to the team via e-mail. According to this construction, the result of a determination can be transmitted to the terminal devices belonging to the team via e-mail. Accordingly, because the result of a determination can be transmitted to the terminal devices belonging to the team members via e-mail, the players can confirm the result of a member deletion request or a member replacement request.

In the invention described above, a plurality of admission criteria can be prepared in advance for possible selection. According to this construction, because the selected admission criterion is added by being selected from among a plurality of admission criteria, members that are desired by the players can be admitted to the team. Accordingly, because a member desired by a player can be added to the team, and players' desires can be taken into account, team members can be replaced by members having the same intentions, making the game more interesting.

In the invention, the member replacement means preferably prevent the selection of the terminal device that was deleted by the member information deletion means. According to this construction, because the selection of the terminal device that was deleted by the member information deletion means is prevented, a deleted terminal device can no longer join the same team again. Accordingly, because a deleted terminal device can no longer join the same team again, a new player is certain to be registered.

In the invention, the terminal devices that constitute a team are preferably each assigned different roles. According to this construction, because a role is assigned to each terminal device and a team is composed of a prescribed number of terminal devices that fulfill different roles, terminal devices that perform the same roles no longer exist on the same team. Accordingly, because terminal devices that perform the same roles no longer exist on the same team, individual players' roles are firmly established, making the game more interesting.

The present invention relates also to a recording medium for storing a game action control program wherein a game server connected to a network and on which a game is played by teams via the transmission and receipt of information over the network between said server and the plurality of terminal devices that constitute a team in which said action control program comprising the steps of: causing said game server to associate together identifying information regarding three or more terminal devices and to store said associated identifying information in memory as one team; causing said game server to transmit a member deletion request regarding one terminal device belonging to the team from the another one of said terminal devices belonging to said team to the other terminal devices belonging to said team and to delete the identifying information of said one of the terminal device from said memory based on the responses from each terminal device in regard to said member deletion request; and causing said game server to transmit a member admission request from one terminal device belonging to said team to the other terminal devices belonging to said team, select a terminal device that does not belong to said team and satisfies admission criteria included in said member admission request based on the responses from the other terminal devices to said member admission request, and to store the identifying information regarding the selected terminal device in said memory as a member of said team.

According to this construction described in the above, identifying information regarding three or more terminal devices from among a plurality of terminal devices previously registered as members is associated together and stored in a prescribed memory as a team. A member deletion request is transmitted from one terminal device belonging to the team regarding which identifying information is associated together, to the terminal devices of the other members to the team, seeking deletion of another terminal device stored in the memory as a member of the team. Based on the responses of each terminal device to this member deletion request, the identifying information regarding the other terminal device is deleted from the memory. Following this deletion processing, a member admission request seeking the admission of a new terminal device as a member of the team to replace the terminal device deleted from the memory is sent by a terminal device belonging to the team to the other terminal devices belonging to the team. Based on the responses of each terminal device to this member admission request, a terminal device that satisfies the admission criteria included in the member admission request is selected from among terminal devices that are not registered in the memory and do not belong to the team, and the identifying information regarding the selected terminal device is stored in the memory as a team member. In this way, a player having a different game intention or a player with a low skill level can be removed from the team and a new member having the same game intention or a member with a high skill level can be admitted to the team. Accordingly, a member having a different game intention or a member with a low skill level can be removed from the team and a new member can be admitted to the team. In this way, the members comprising the team can be replaced, such that the game may be played with members having the same game intentions, making the game more interesting.

Furthermore, the present invention relates to a network game action control method that enables communication of information between a server and a plurality of terminal devices over a network, in which said method comprising the steps of: associating identifying information regarding three or more terminal devices and for storing the associated information in a memory of said server as a team; transmitting a member deletion request regarding one terminal device belonging to the team from the another one of said terminal devices belonging to said team to the other terminal devices belonging to said team and for deleting the identifying information of said one of the terminal device from said memory based on the responses from each terminal device in regard to said member deletion request; and transmitting a member admission request from one terminal device belonging to said team to the other terminal devices belonging to said team, selecting a terminal device that does not belong to said team and satisfies admission criteria included in said member admission request based on the responses from the other terminal devices to said member admission request, and for storing the identifying information regarding the selected terminal device in said memory as a member of said team.

According to this construction, identifying information regarding three or more terminal devices from among a plurality of terminal devices previously registered as members is associated together and stored in a prescribed memory as a team. A member deletion request is transmitted from one terminal device belonging to the team regarding which identifying information is associated together, to the terminal devices of the other members to the team, seeking deletion of another terminal device stored in the memory as a member of the team. Based on the responses of each terminal device to this member deletion request, the identifying information regarding the other terminal device is deleted from the memory. Following this deletion processing, a member admission request seeking the admission of a new terminal device as a member of the team to replace the terminal device deleted from the memory is sent by a terminal device belonging to the team to the other terminal devices belonging to the team. Based on the responses of each terminal device to this member admission request, a terminal device that satisfies the admission criteria included in the member admission request is selected from among terminal devices that are not registered in the memory and do not belong to the team, and the identifying information regarding the selected terminal device is stored in the memory as a team member. In this way, a player having a different game intention or a player with a low skill level can be removed from the team and a new member having the same game intention or a member with a high skill level can be admitted to the team. Accordingly, a member having a different game intention or a member with a low skill level can be removed from the team and a new member can be admitted to the team. In this way, the members comprising the team can be replaced, such that the game may be played with members having the same game intentions, making the game more interesting.

This application is based on Japanese patent application serial no. 2001-133451, filed in Japan Patent Office on Apr. 27, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A game server that transmits and receives information to and from a plurality of terminal devices over a network, said game server comprising:

a memory;

member information processing means for associating identifying information regarding a first, a second and a third terminal device from said plurality of terminal devices;

said member information processing means storing, as a team, the associated information in said memory from said first, second and third terminal devices;

member information deletion means for transmitting a member deletion request regarding said first terminal device from said second terminal device to said third terminal device;

said member information deletion means deleting the identifying information of said first terminal device from said memory responsive to an agreement to delete said first terminal device from said second and third terminal devices; and member replacement means for transmitting an admission criteria selection screen to one terminal device of said team responsive to said one terminal device requesting an admission of another terminal device into said team, said another terminal device not belonging to said team, said another terminal device satisfying admission criteria included in said member admission request, said admission criteria being defined by a plurality of criteria;

said member replacement means transmitting a member admission request from said one terminal device to other terminal devices on said team responsive to an agreement to admit another terminal device by said team;

said member replacement means selecting a fourth terminal device from said plurality of terminal devices responsive to member selection criteria provided from the other terminal devices; and said member replacement means storing the identifying information regarding the fourth terminal device in said memory as a member of said team.

2. The game server according to claim 1, further comprising reference means for enabling reference to game histories of the other terminal devices belonging to said team.

3. The game server according to claim 1, wherein said member information deletion means carries out determination regarding whether or not to grant the member deletion request based on a principle of majority vote.

4. The game server according to claim 1, wherein said member replacement means carries out determination regarding whether or not to grant the member admission request based on a principle of majority vote.

5. The game server according to claim 1, further comprising an e-mail transmission means for transmitting the result of said determination to the terminal devices belonging to said team via e-mail.

6. The game server according to claim 1, wherein said plurality of said admission criteria is selectable from criteria prepared in advance.

7. The game server according to claim 1, wherein said member replacement means prevents the selection of the terminal device that was deleted by the member information deletion means.

8. The game server according to claim 1, wherein the terminal devices that constitute a team are each assigned different roles.

9. The game server of claim 1, wherein said member replacement means transmits a vote screen from said game server to the other team terminal devices, said member replacement means receiving votes for the admission criteria from said other team terminal devices.

10. The game server of claim 1, wherein said member information deletion means sends a vote screen to said third team terminal device for identifying said second team terminal device as the terminal sending said member deletion request.

11. A recording medium for storing a game action control program, wherein a game server connects over a network to a plurality of terminal devices, said plurality of terminal devices defining one or more teams, said game being played on said server by said teams by transmitting and receiving information over the network between said server and said teams, said action control program causing said game server to perform steps, said steps comprising:

associating identifying information regarding a first, a second and a third terminal device from said plurality of terminal devices;

storing, as one team, said associated identifying information in a memory;

transmitting a member deletion request regarding said first terminal device from said second terminal device to said third terminal device;

deleting the identifying information of said first terminal device from said memory responsive to an agreement to delete said first terminal device from said second and third terminal devices;

transmitting an admission criteria selection screen to one terminal device of said team responsive to said one terminal device requesting an admission of another terminal device into said team, said another terminal device not belonging to said team, said another terminal device satisfying admission criteria included in said member admission request, said admission criteria being defined by a plurality of criteria;

transmitting a member admission request from said one terminal device to other terminal devices on said team responsive to an agreement to admit another terminal device by said team;

selecting a fourth terminal device from said plurality of terminal devices responsive to member selection criteria provided other terminal devices; and storing the identifying information regarding the fourth terminal device in said memory as a member of said team.

12. A network game action control method for enabling communication of information between a server and a plurality of terminal devices over a network, said method comprising the steps of:

associating identifying information regarding a first, a second and a third terminal device from said plurality of terminal devices;

storing, as a team, the associated information for said first, second and third terminal devices in a memory of said server;

transmitting a member deletion request regarding said first terminal device from said second terminal device to said third terminal device;

deleting the identifying information of said first terminal device from said memory responsive to an agreement to delete said first terminal device from said second and third terminal devices;

transmitting an admission criteria selection screen to one terminal device of said team responsive to said one terminal device requesting an admission of another terminal device into said team, said another terminal device not belonging to said team, said another terminal device satisfying admission criteria included in said member admission request, said admission criteria being defined by a plurality of criteria;

transmitting a member admission request from said one terminal device to other terminal devices on said team responsive to an agreement to admit another terminal device by said team;

selecting a fourth terminal device from said plurality of terminal devices responsive to member selection criteria provided from the other terminal devices; and storing the identifying information regarding the fourth terminal device in said memory as a member of said team.

13. A game server for transmitting and receiving information to and from a plurality of terminal devices over a network, said game server comprising:

a memory;

member information processing means for associating identifying information regarding a first, a second and a third terminal device from said plurality of terminal devices;

said member information processing means staring, as a team, the associated information in said memory;

reference means for enabling any of said terminal devices to refer to game histories of the other terminal devices on said team for deciding whether to execute one of a member deletion or a member replacement;

member information deletion means for transmitting a member deletion request regarding said first terminal device from said second terminal device to said third terminal device;

said member information deletion means deleting the identifying information of said first terminal device from said memory responsive to an agreement to delete said first terminal device from said second and third terminal devices;

member replacement means for transmitting an admission criteria selection screen to one terminal device of said team responsive to said one terminal device requesting an admission of another terminal device into said team, said another terminal device not belonging to said team, said another terminal device satisfying admission criteria included in said member admission request, said admission criteria being defined by a plurality of criteria;

said member replacement means transmitting a member admission request from said one terminal device to other terminal devices on said team responsive to an agreement to admit another terminal device by said team;

said member replacement means selecting a fourth terminal device from said plurality of terminal devices responsive to member selection criteria provided from the other terminal devices; and said member replacement means storing the identifying information regarding the fourth terminal device in said memory as a member of said team.

14. The game server according to claim 1, wherein said team is a band and each of said terminal devices plays a specific part in said band.

15. A game server for, transmitting and receiving information to and from a plurality of terminal devices over a network, said game server comprising;

a memory;

member information processing means for associating identifying information regarding a first, a second and a third terminal device from said plurality of terminal devices;

said member information processing means storing, as a team, the associated information in said memory;

reference means for enabling any of said terminal devices to refer to game histories of the other terminal devices on said team in order to decide whether or not to execute one of a member deletion or a member replacement;

member information deletion means for transmitting a member deletion request regarding said first terminal device, which concurrently is actively involved in playing the game with the team, from said second terminal device to said third terminal device;

said member information deletion means deleting the identifying information of said one of the terminal device from said memory responsive to an agreement to delete said first terminal device from said second and third terminal devices;

member replacement means for transmitting an admission criteria selection screen to one terminal device of said team responsive to said one terminally device requesting an admission of another terminal device into said team, said another terminal device not belonging to said team, said another terminal device satisfying admission criteria included in said member admission request, said admission criteria being defined by a plurality of criteria;

said member replacement means transmitting a member admission request from said one terminal device to other terminal devices on said team responsive to an agreement to admit another terminal device by said team;

said member replacement means selecting a fourth terminal device from said plurality of terminal devices responsive to member section criteria provided from the other terminal device; and said member replacement means storing the identifying information regarding the fourth terminal device in said memory as a member of said team.

* * * * *